US012647878B2

(12) United States Patent
Lee et al.

(10) Patent No.: US 12,647,878 B2
(45) Date of Patent: Jun. 2, 2026

(54) SESSION MANAGEMENT METHOD ACCORDING TO APPLICATION OF USER EQUIPMENT POLICY IN WIRELESS COMMUNICATION SYSTEM

(71) Applicant: Samsung Electronics Co., Ltd., Gyeonggi-do (KR)

(72) Inventors: Hoyeon Lee, Gyeonggi-do (KR); Sangsoo Jeong, Gyeonggi-do (KR); Youngsung Kho, Gyeonggi-do (KR)

(73) Assignee: Samsung Electronics Co. Ltd (KR)

( * ) Notice: Subject to any disclaimer, the term of this patent is extended or adjusted under 35 U.S.C. 154(b) by 437 days.

(21) Appl. No.: 17/912,993

(22) PCT Filed: Mar. 29, 2021

(86) PCT No.: PCT/KR2021/003853
§ 371 (c)(1),
(2) Date: Sep. 20, 2022

(87) PCT Pub. No.: WO2021/194323
PCT Pub. Date: Sep. 30, 2021

(65) Prior Publication Data
US 2023/0147538 A1 May 11, 2023

(30) Foreign Application Priority Data

Mar. 27, 2020 (KR) ........................ 10-2020-0037802
Apr. 17, 2020 (KR) ........................ 10-2020-0046832

(51) Int. Cl.
| | |
|---|---|
| *H04W 48/00* | (2009.01) |
| *H04L 67/14* | (2022.01) |
| *H04W 48/18* | (2009.01) |

(52) U.S. Cl.
CPC ............. *H04W 48/17* (2013.01); *H04L 67/14* (2013.01); *H04W 48/18* (2013.01)

(58) Field of Classification Search
CPC ..... H04W 48/17; H04W 48/18; H04W 76/15; H04W 60/00; H04W 60/04; H04W 76/12;
(Continued)

(56) References Cited

U.S. PATENT DOCUMENTS

| | | |
|---|---|---|
| 10,231,250 B2 | 3/2019 | Griot et al. |
| 10,791,455 B2 | 9/2020 | Wang |
| (Continued) | | |

FOREIGN PATENT DOCUMENTS

| | | |
|---|---|---|
| CN | 110431805 | 11/2019 |
| CN | 110582121 | 12/2019 |
| (Continued) | | |

OTHER PUBLICATIONS

Ericsson et al., "DNN Replacement in 5GC", S2-1908599, 3GPP TSG-SA WG2 Meeting #134, Jun. 24-28, 2019, 5 pages.
(Continued)

*Primary Examiner* — Rushil P. Sampat
(74) *Attorney, Agent, or Firm* — The Farrell Law Firm, P.C.

(57) ABSTRACT

According to an embodiment of the present disclosure, a policy control function (PCF) entity for managing policies may be provided. The PCF entity may transmit, to a user equipment via an Access and Mobility Management Function (AMF), URSP information including first data network name (DNN) information, identify a triggering event for updating the URSP, transmit, to the user equipment via the AMF based on the identified triggering event, updated URSP information including second DNN information, transmit, when transmitting the updated URSP information including the second DNN information, a Session Management Function (SMF) selection management trigger message to the AMF, and receive a user equipment policy update request message from the AMF when a request from the
(Continued)

120
AMF

140
PCF

510. PCF event

512. Policy Decision

514. Npcf_AMPolicyControl_UpdateNotify Request or Npcf_UEPolicyControl_UpdateNotify Request 516. Npcf_AMPolicyControl_UpdateNotify Response or Npcf_UEPolicyControl_UpdateNotify Response 518. Deploy the policy received from the PCF AMF for at least one of a first DNN corresponding to the first DNN information or a third DNN is detected.

11 Claims, 10 Drawing Sheets

(58) Field of Classification Search
CPC .. H04L 67/14; H04L 65/1016; H04L 65/1073
See application file for complete search history.

(56) References Cited

U.S. PATENT DOCUMENTS

| | | | |
|---|---|---|---|
| 10,979,886 B2 | 4/2021 | Ianev et al. | |
| 11,510,257 B2 | 11/2022 | La | |
| 2019/0053308 A1* | 2/2019 | Castellanos Zamora | |
| | | | H04L 65/1073 |
| 2019/0098537 A1* | 3/2019 | Qiao | H04W 36/0033 |
| 2019/0261260 A1 | 8/2019 | Dao et al. | |
| 2019/0268835 A1* | 8/2019 | Shan | H04W 48/16 |
| 2020/0228936 A1* | 7/2020 | Talebi Fard | H04W 4/08 |
| 2020/0267785 A1* | 8/2020 | Talebi Fard | H04L 45/04 |
| 2020/0367052 A1 | 11/2020 | Tang | |
| 2021/0029628 A1* | 1/2021 | Kim | H04W 48/18 |
| 2021/0120596 A1* | 4/2021 | Youn | H04W 76/12 |
| 2021/0360294 A1* | 11/2021 | Liao | H04L 41/5019 |
| 2022/0191052 A1* | 6/2022 | Garcia Azorero | H04L 12/14 |
| 2022/0369401 A1* | 11/2022 | Won | H04W 76/10 |

FOREIGN PATENT DOCUMENTS

| | | |
|---|---|---|
| CN | 110582126 | 12/2019 |
| WO | WO 2018/024028 | 2/2018 |
| WO | WO 2019/073977 | 4/2019 |
| WO | WO 2019/153766 | 8/2019 |

OTHER PUBLICATIONS

Samsung, "Policy Update on DNN Replacement", S2-2000793, SA WG2 Meeting #136 Ad-hoc, Jan. 13-17, 2020, 2 pages.
Chinese Office Action dated Jun. 1, 2024 issued in counterpart application No. 202180025263.6, 28 pages.

3GPP TS 23.503 V16.4.0, 3rd Generation Partnership Project; Technical Specification Group Services and System Aspects; Policy and Charging Control Framework for the 5G System (5GS); Stage 2 (Release 16), Mar. 2020, 115 pages.
3GPP TS 23.502 V16.4.0, 3rd Generation Partnership Project; Technical Specification Group Services and System Aspects; Procedures for the 5G System (5GS); Stage 2 (Release 16), Mar. 2020, 581 pages.
European Search Report dated Jun. 16, 2023 issued in counterpart application No. 21775931.5-1216, 10 pages.
ZTE, "Optimal Policy Control Support for PDU Session Establishment", S2-1903692, SA WG2 Meeting #132, Apr. 7-12, 2019, 16 pages.
Korean Office Action dated Sep. 29, 2024 issued in counterpart application No. 10-2020-0046832, 6 pages.
European Search Report dated Oct. 21, 2024 issued in counterpart application No. 21775931.5-1215, 14 pages.
Chinese Office Action dated Nov. 29, 2024 issued in counterpart application No. 202180025263.6, 5 pages.
3GPP TS 23.503 V16.3.0, 3rd Generation Partnership Project; Technical Specification Group Services and System Aspects; Policy and Charging Control Framework for the 5G System (5GS); Stage 2 (Release 16), Dec. 2019, 113 pages.
ZTE Wistron, "Network Initiated Trigger for PCF to Update URSP Rule in UE", S2-187718, SA WG2 Meeting #128bis, Aug. 19-24, 2018, 3 pages.
Motorola Mobility et al., "Clarification on Support of UE Policies by the UE", S2-2000744, 3GPP TSG-WG SA2 Meeting #136-ah, Jan. 13-17, 2020, 6 pages.
International Search Report dated Jun. 25, 2021 issued in counterpart application No. PCT/KR2021/003853, 17 pages.
Samsung, "Policy Update on DNN Replacement", S2-2002178r04, 3GPP TSG-SA WG2 Meeting #137-E, Feb. 24-27, 2020, 4 pages.
Chinese Office Action dated May 14, 2025 issued in counterpart application No. 202180025263.6, 20 pages.
Korean Office Action dated Jun. 26, 2025 issued in counterpart application No. 10-2020-0046832, 9 pages.
Chinese Office Action dated Aug. 1, 2025 issued in counterpart application No. 202180025263.6, 22 pages.
Korean Office Action dated Feb. 5, 2026 issued in counterpart application No. 10-2020-0046832, 10 pages.

* cited by examiner

FIG. 10

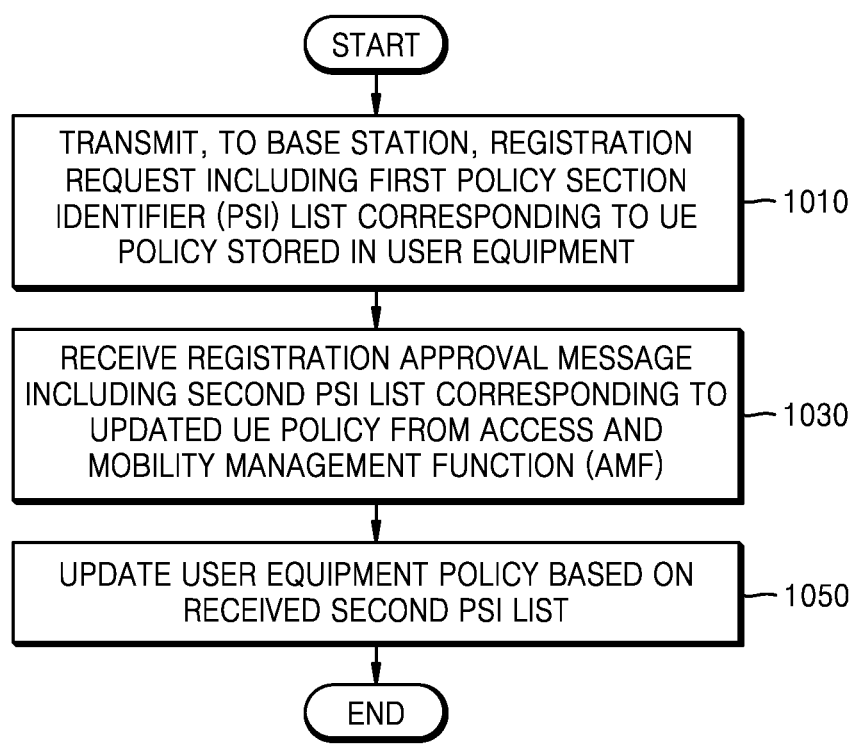

START

TRANSMIT, TO BASE STATION, REGISTRATION REQUEST INCLUDING FIRST POLICY SECTION IDENTIFIER (PSI) LIST CORRESPONDING TO UE POLICY STORED IN USER EQUIPMENT — 1010

RECEIVE REGISTRATION APPROVAL MESSAGE INCLUDING SECOND PSI LIST CORRESPONDING TO UPDATED UE POLICY FROM ACCESS AND MOBILITY MANAGEMENT FUNCTION (AMF) — 1030

UPDATE USER EQUIPMENT POLICY BASED ON RECEIVED SECOND PSI LIST — 1050

END

FIG. 11

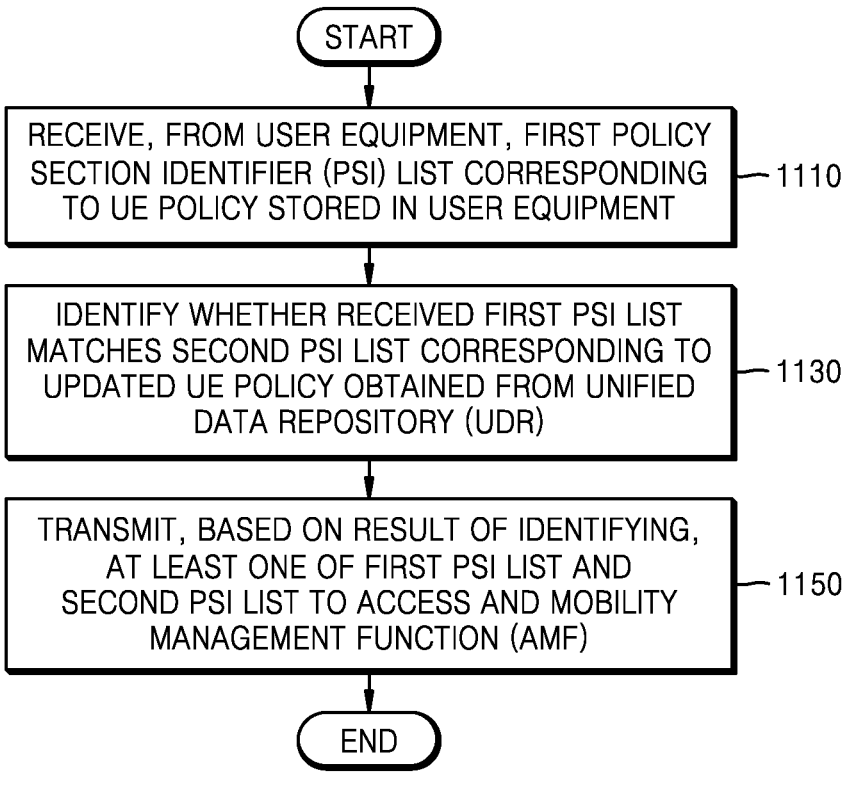

START

RECEIVE, FROM USER EQUIPMENT, FIRST POLICY
SECTION IDENTIFIER (PSI) LIST CORRESPONDING
TO UE POLICY STORED IN USER EQUIPMENT    — 1110

IDENTIFY WHETHER RECEIVED FIRST PSI LIST
MATCHES SECOND PSI LIST CORRESPONDING TO
UPDATED UE POLICY OBTAINED FROM UNIFIED
DATA REPOSITORY (UDR)    — 1130

TRANSMIT, BASED ON RESULT OF IDENTIFYING,
AT LEAST ONE OF FIRST PSI LIST AND
SECOND PSI LIST TO ACCESS AND MOBILITY
MANAGEMENT FUNCTION (AMF)    — 1150

END

SESSION MANAGEMENT METHOD ACCORDING TO APPLICATION OF USER EQUIPMENT POLICY IN WIRELESS COMMUNICATION SYSTEM

PRIORITY

This application is a National Phase Entry of PCT International Application No. PCT/KR2021/003853, which was filed on Mar. 29, 2021, and claims priority to Korean Patent Application Nos. 10-2020-0037802 and 10-2020-0046832, which were filed on Mar. 27, 2020 and Apr. 17, 2020, respectively, the entire content of each of which is incorporated herein by reference.

TECHNICAL HELD

The present disclosure relates to a method and apparatus for providing a service in a wireless communication system, and more particularly, to a method and apparatus for providing a service requested by a user equipment, in a wireless communication system.

BACKGROUND ART

To meet the ever-increasing demand with respect to wireless data traffic since the commercialization of the 4th generation (4G) communication system, there have been efforts to develop an advanced 5th generation (5G) or pre-5G communication system. This is one reason why '5G communication systems' or 'pre-5G communication systems' are called 'beyond 4G network communication systems' or 'post Long-Term Evolution (LTE) systems.' In order to achieve a high data rate, consideration is given to implementing 5G communication systems in millimeter wave (mmW) frequency bands (e.g., 60 gigahertz (GHz) bands), In order to reduce path loss of radio waves and increase a propagation distance of radio waves in superhigh frequency bands, in 5G communication systems, discussions are underway about technologies such as beamforming, massive multiple-input multiple-output (MIMO), full dimensional MIMO (FD-MIMO), array antennas, analog beamforming, and large scale antennas. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (COMP), and received-interference cancellation is underway. In addition, for 5G systems, advanced coding modulation (ACM) technologies such as hybrid frequency-shift keying (FSK) and quadrature amplitude modulation (QAM) (FOAM) and sliding window superposition coding (MSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances and advanced medical services through convergence and combination between existing information technologies (IT) and various industrial applications.

Various attempts have been made to apply 5G communication systems to IoT networks. For example, technologies related to sensor networks, M2M communication, and MTC are being implemented by using 5G communication technology including beamforming, MIMO, and array antennas. The application of a cloud RAN as big data processing technology may also be considered as an example of convergence of 5G technology and IoT technology.

As described above, various services may be provided due to the development of wireless communication systems, and thus, there is a need for methods of seamlessly providing such services.

DESCRIPTION OF EMBODIMENTS

Technical Problem

Provided are an apparatus and method for effectively providing a service in a wireless communication system.

Solution to Problem

According to an embodiment of the present disclosure, a policy control function (PCF) entity for managing policies may be provided. The PCF entity may be configured to transmit User Equipment Route Selection Policy (URSP) information including first Data Network Name (DNN) information to a user equipment through an Access and Mobility management Function (AMF), identify a triggering event to update the URSP, transmit, based on the identified triggering event, updated URSP information including second DNN information to the user equipment through the AMF, transmit a Session Management Function (SMF) selection management trigger message to the AMF, when transmitting the updated URSP information including the second DNN information, and receive a user equipment policy update request message from the AMF when a request from the AMF for at least one of a first DNN corresponding to the first DNN information or a third DNN is detected.

Advantageous Effects of Disclosure

The disclosed embodiments provide apparatuses and methods capable of effectively providing services in a wireless communication system.

BRIEF DESCRIPTION OF DRAWINGS

FIG. 10 is a flowchart of an operating method of a user equipment, according to an embodiment of the present disclosure.

FIG. 11 is a flowchart of an operating method of a policy control function (PCF), according to an embodiment of the present disclosure.

BEST MODE

Figure 1:
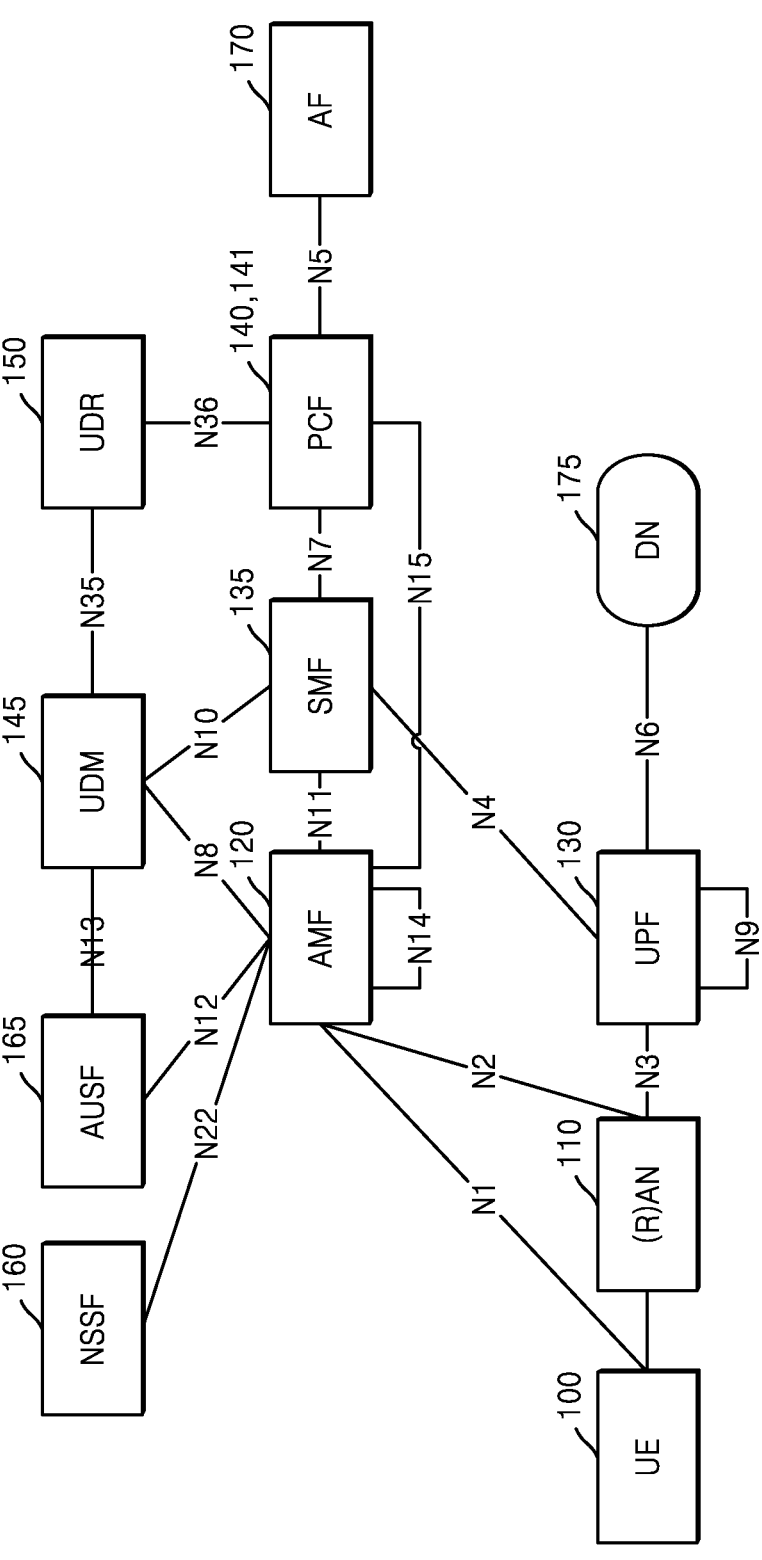
FIG. 1 is a view illustrating a network structure of a 5G system (5GS) according to an embodiment of the present disclosure.

A policy control function (PCF) entity for managing policies, according to an embodiment of the present disclosure, may include a transceiver and at least one processor. The at least one processor may be configured to transmit User Equipment Route Selection Policy (URSP) information including first Data Network Name (DNN) information to a user equipment through an Access and Mobility management Function (AMF), identify a triggering event to update the URSP, transmit, based on the identified triggering event, updated URSP information including second DNN information to the user equipment through the AMF, transmit a Session Management Function (SMF) selection management trigger message to the AMF, when transmitting the updated URSP information including the second DNN information, and receive a user equipment policy update request message from the AMF when a request from the AMF for at least one of a first DNN corresponding to the first DNN information or a third DNN is detected.

In an embodiment, the at least one processor may be further configured to select a DNN based on the received user equipment policy update request message, and provide the selected DNN to the AMF, wherein the selected DNN includes the second DNN.

In an embodiment, a Protocol Data Unit (PDU) session between the user equipment and a network may be established based on the selected DNN information, after a Session Management Function (SMF) has received, from the AMF, a PDU session management context request message including information about the selected DNN and user equipment-requested DNN information.

In an embodiment, the SMF selection management trigger message may include the first Data Network Name (DNN) information.

In an embodiment, the updated URSP information and the SMF selection management trigger message may be included in a single message and transmitted or are included in different messages and transmitted.

In an embodiment, the triggering event to update the URSP may be identified based on at least one of user equipment subscription information, operator policy information, information received from the user equipment, or information received from the AMF.

In an embodiment, a PDU session between the user equipment and a network may be established based on a result of comparing at least one of the first DNN information received by the AMF from the PCF or information received by the AMF from a Unified Data Management (UDM) with user equipment-requested DNN information received from the user equipment.

A user equipment in a wireless communication system, according to another embodiment of the present disclosure, includes: a transceiver; and at least one processor, wherein the at least one processor is configured to: receive, from an Access and Mobility management Function (AMF), User Equipment Route Selection Policy (URSP) information including first data Network Name (DNN) information provided by a policy control function (PCF), transmit, to the AMF based on the received URSP information, a protocol data unit (PDU) session establishment request message including user equipment-requested DNN information about at least one of a first DNN corresponding to the first DNN information or a third DNN, wherein a PDU session between the user equipment and a network is established based on the selected DNN information, after a Session Management Function (SMF) has received, from the AMF, a PDU session management context request message including information about a DNN selected by the PCF and the user equipment-requested DNN information, and the information about the DNN selected by the PCF includes second DNN information that is different from the first DNN and the third DNN.

In an embodiment, the PDU session may be established based on a result of comparing at least one of the first DNN information received by the AMF from the PCF or information received from a Unified Data Management (UDM) with the user equipment-requested DNN information.

An Access and Mobility management function (AMF) entity for managing policies, according to another embodiment of the present disclosure, includes: a transceiver; and at least one processor, wherein the at least one processor is configured to receive a Session Management Function (SMF) selection management trigger message, when receiving updated URSP information including second DNN information from a policy control function (PCF), transmit the received updated URSP information to a user equipment, receive, from the user equipment, a protocol data unit (PDU) session establishment request message including user equipment-requested DNN information corresponding to a first DNN, detect, based on the received PDU session establishment request message, the user equipment requesting the first DNN, and transmit a user equipment policy update request message to the PCF.

In an embodiment, the at least one processor may be further configured to transmit, to the Session Management Function (SMF), a session management context request message including DNN information selected by the PCF or the user equipment-requested DNN information.

In an embodiment, the at least one processor may be further configured to receive, from the PCF, DNN information selected based on the user equipment policy update request message, wherein the selected DNN includes the second DNN.

In an embodiment, the at least one processor may be further configured to receive, from the PCF, in response to the user equipment policy update request message, a user equipment policy update response message including DNN information selected by the PCF, transmit, to an Session Management Function (SMF), a protocol data unit (PDU) session management context request message including information about the selected DNN and user equipment-requested DNN information, wherein a PDU session between the user equipment and a network is established based on the selected DNN information after the Session Management Function (SMF) has received the PDU session management context request message from the AMF.

In an embodiment, the SMF selection management trigger message may include the first DNN information.

In an embodiment, the updated URSP information and the SMF selection management trigger message may be included in a single message and transmitted or are included in different messages and transmitted.

In an embodiment, the at least one processor may be configured to identify that the second DNN information does not match the user equipment-requested DNN information, and transmit a user equipment policy update request message to the PCF based on a result of the identifying.

An operating method of a policy control function (PCF) entity for managing policies, according to another embodiment of the present disclosure, includes transmitting, to a user equipment, User Equipment Route Selection Policy (URSP) information including first Data Network Name (DNN) information to a user equipment through an Access and Mobility management Function (AMF), identifying a triggering event to update the URSP, transmitting, based on the identified triggering event, updated URSP information including second DNN information to the user equipment through the AMF, transmitting a Session Management Function (SMF) selection management trigger message to the AMF, when transmitting the updated URSP information including the second DNN information, and receiving a user equipment policy update request message from the AMF when a request from the AMF for at least one of a first DNN corresponding to the first DNN information or a third DNN is detected.

An operating method of a user equipment in a wireless communication system, according to another embodiment of the present disclosure, includes receiving, from an Access and Mobility management Function (AMF), User Equipment Route Selection Policy (URSP) information including first data Network Name (DNN) information provided by a policy control function (PCF), and transmitting, to the AMF based on the received URSP information, a protocol data unit (PDU) session establishment request message including user equipment-requested DNN information about at least one of a first DNN corresponding to the first DNN information or a third DNN, wherein a PDU session between the user equipment and a network is established based on the selected DNN information, after a Session Management Function (SMF) has received, from the AMF, a PDU session management context request message including information about a DNN selected by the PCF and the user equipment-requested DNN information, and the information about the DNN selected by the PCF includes second DNN information that is different from the first DNN and the third DNN.

An operating method of an Access and Mobility management Function (AMF) entity for managing policies, according to another embodiment of the present disclosure, includes receiving a Session Management Function (SMF) selection management trigger message, when receiving updated URSP information including second DNN information from a policy control function (PCF), transmitting the received updated URSP information to a user equipment, receiving, from the user equipment, a protocol data unit (PDU) session establishment request message including user equipment-requested DNN information corresponding to a first DNN, detecting, based on the received PDU session establishment request message, the user equipment requesting the first DNN, and transmitting a user equipment policy update request message to the PCF.

Mode of Disclosure

Hereinafter, embodiments of the present disclosure will be described in detail with reference to the attached drawings. While describing the present disclosure, detailed descriptions of related well-known functions or configurations that may blur the points of the present disclosure are omitted. The terms used herein are those defined in consideration of functions in regard to the present disclosure, but the terms may vary according to the intention of users or operators, precedents, etc, Thus, the terms used in the specification should be understood based on the overall description of the present disclosure.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that blocks in flowcharts or combinations of the flowcharts may be performed by computer program instructions, Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s), These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two consecutive blocks may also be executed simultaneously or in reverse order depending on functions corresponding thereto.

As used herein, the term " . . . unit" denotes a software element or a hardware element such as a field-programmable gate array (FPGA) or an application-specific integrated circuit (ASIC), and performs a certain function. However, " . . . unit" does not mean to be limited to software or hardware. The term " . . . unit" may be configured to be in an addressable storage medium or configured to operate one or more processors. Thus, the term ' . . . unit' or ' . . . er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. The functionality provided in components and " . . . units" may be combined into fewer components and " . . . units" or further separated into additional components and " . . . units". Further, components and " . . . units" may be implemented to operate one or more central processing units (CPUs) in a device or a secure multimedia card. Also, the " . . . unit" may include at least one processor.

In the description of the present disclosure, certain detailed explanations of related art are omitted when it is deemed that they may unnecessarily obscure the essence of the present disclosure. Hereinafter, an embodiment of the present disclosure will be described with reference to the drawings.

Hereinafter, terms indicating a connection node, terms indicating network entities, terms indicating messages, terms indicating an interface between network entities, and terms indicating various pieces of identification information used herein are exemplified for convenience of description. Thus, the present disclosure is not limited by the following terms, and other terms having equivalent technical meaning may be used.

Hereinafter, some terms and names defined in the 3rd generation partnership project long term evolution (3GPP LTE) standard or 5G standards may be used for convenience of description. The present disclosure is not, however, limited by the terms and definitions, and may be equally applied to any systems that conform to other standards. In particular, the present disclosure may be applied to a 3GPP New Radio (NR, 5th Generation mobile communication standards). In the present disclosure, an evolved node B (eNB) may be interchangeably used with a next generation node B (gNB) for convenience of description. That is, a base station described as an eNB may refer to a gNB. Alternatively, a base station described as a gNB may refer to an eNB. Alternatively, a node described as a base station may refer to eNB or gNB. Also, the term "user equipment" may refer to other wireless communication devices as well as mobile phones, NB-IoT devices, and sensors.

Hereinafter, a base station is an entity that assigns resources of a user equipment, and may be at least one of a gNode B, an eNode B, a base station (BS), a wireless access unit, a base station controller, or a node on a network. Examples of a user equipment may include a user equipment (UE), a mobile station (MS), a cellular phone, a smartphone, a computer, or a multimedia system capable of performing a communication function. However, the present disclosure is not limited to the above examples.

In the present disclosure, the term "service" may be interchangeably used to refer to a specific communication equipment (or a Network Function (NF)) performing a request of another communication equipment (or an NF) (that is, referring to an NF service), services provided by a mobile communication operator (i.e., voice service, text service, data service, etc.), and services provided by Over The Top (OTT) operators (i.e., messenger service, game service, etc.).

The wireless communication system may provide access/registration (attach, registration) and session connection (PDN connection, PDU session) of a user equipment to provide a service. To this end, a protocol between a user equipment (UE) and a Network Function (NF) of a mobile communication system may be defined, and the user equipment and the NF may exchange various parameters defined by a control plane signaling protocol.

According to embodiments of the present disclosure, when the parameters (e.g., Data Network Name (DNN), Single Network Slice Selection Assistance Information (S-NSSAI), etc.) transmitted by the user equipment to the NF are not valid, or when the parameters are not available for provision in a wireless communication system (e.g., 5GS, EPS, etc.), instead of rejecting a request from the user equipment (session release), the parameters transmitted by the user equipment may be replaced by available parameters to thereby prevent service errors or a decrease in customer service quality. Alternatively, according to the embodiments of the present disclosure, service errors or a decrease in customer service quality may be prevented by temporarily granting a request from the user equipment, instead of rejecting the request (session release). Alternatively, according to the embodiments of the present disclosure, the user equipment may be induced to use the correct parameters by notifying, by a network, the user equipment of the cause of rejecting the request from the user equipment (session release).

FIG. 1 is a view illustrating a network structure of a 5G system (5GS) according to an embodiment of the present disclosure.

Referring to FIG. 1, a 5G core network may be composed of an Access and Mobility Management Function (AMF) 120, a Session Management Function (SMF) 135, a User Plane Function (UPF) 130, Policy Control Functions (PCF) 140, 141, a Unified Data Management (UDM) 145, a Network Slice Selection Function (NSSF) 160, an Authentication Server Function (AUSF) 165, a Unified Data Repository (UDR) 150, and the like. The user equipment 100 may access the 5G core network through a base station 110. Hereinafter, the UE 100 may be referred to as a user equipment 100, and a (R)AN 110 may be referred to as the base station 110. In addition, the 5G core network may further include an Application Function (AF) 170 and a Data Network (DN) 175.

According to an embodiment, the AMF 120 is a network function (NF) that manages wireless network access and mobility for the user equipment 100.

The SMF 135 is an NF that manages a session for the user equipment 100, and session information thereof includes Quality of Service (QoS) information, charging information, and packet processing information.

The UPF 130 is an NF that processes user traffic (e.g., user plane traffic), and is controlled by the SMF 135.

The PCFs 140 and 141 are NFs that manage operator policy (PLMN policy) for providing a service in a wireless communication system. In addition, the PCFs may be divided into a PCF 140 which is in charge of Access and Mobility (AM) policy and UE policy, and a PCF 141 which is in charge of Session Management (SM) policy. The PCF 140 and the PCF 141 may be logically or physically separated NFs or may be logically or physically one single NF. [Table 1] shows examples of AM policies managed by the PCF 140. [Table 2-1], [Table 2-2], and [Table 2-3] show examples of UE policies managed by the PCF 140. [Table 3] shows examples of SM policies managed by the PCF 141.

As a method of managing the UE policy, the PCF 140 may divide the UE policy into one or more policy sections. One policy section may be divided or indicated by a Policy Section Identifier (PSI). For example, the PCF 140 may allocate the entire UE policy for the user equipment (i.e., all UE route selection policy (URSP) rules) to one policy section. Alternatively, the PCF 140 may allocate one or several URSP rules among the UE policy for the user equipment 100, to one policy section. The PCF 140 may store and manage latest UE policy-related information (e.g., a list of PSIs) of the user equipment 100.

The user equipment 100 may transmit, to the AMF 120, information related to UE policy stored in the user equipment 100 (e.g., a list of PSIs), during a registration procedure. The AMF 120 may transmit the received UE policy-related information (e.g., a list of PSIs) to the PCF 140. The PCF 140 may compare the received UE policy-related information with the latest UE policy-related information stored in the PCF 140 or obtained from the UDR 150 (e.g., the latest list of PSIs). When the UE policy-related information received from the user equipment does not match the latest UE policy-related information, the PCF 140 may determine that the user equipment 100 is not storing the latest UE policy information, and transmit the latest UE policy information to the user equipment 100.

Alternatively, the PCF 140 may determine a new UE policy based on a change in user equipment subscription information, operator policy, and the like. The PCF 140 may allocate a PSI indicating a new UE policy. The PCF 140 may transmit, to the user equipment 100, the new UE policy and latest PSI first information corresponding thereto. When user equipment transmission is successful, the PCF 140 may store the new UE policy and the latest PSI list information corresponding thereto, in the UDR 150.

TABLE 1

Access and mobility related policy control information

| Information name | Description | Category | PCF permitted to modify in a UE context in the AMF | Scope |
|---|---|---|---|---|
| Service Area Restrictions | This part defines the service area restrictions. | | | |
| List of allowed TAIs. | List of allowed TAIs (NOTE 3) (NOTE 4). | Conditional (NOTE 1) | Yes | UE context |
| List of non-allowed TAIs. | List of non-allowed TAIs (NOTE 3). | Conditional (NOTE 1) | Yes | UE context |
| Maximum number of allowed TAIs | The maximum number of allowed TAIs. (NOTE 4) | Conditional (NOTE 1) | Yes | UE context |
| RFSP Index | This part defines the RFSP index | | | |
| RFSP Index | Defines the RFSP Index that applies for a UE | Conditional (NOTE 2) | Yes | UE context |
| UE-AMBR | This defines the UE-AMBR value that applies for a UE | Conditional (NOTE 5) | Yes | UE context |
| SMF selection management | This part defines the SMF selection management instructions | | | |
| DNN replacement of unsupported DNNs | Defines if a UE requested unsupported DNN is requested for replacement by PCF | Conditional (NOTE 6) | Yes | UE context |
| List of S-NSSAIs | Defines the list of S-NSSAIs containing DNN candidates for replacement by PCF | Conditional (NOTE 6) (NOTE 7) | Yes | UE context |
| Per S-NSSAI: List of DNNs | Defines UE requested DNN candidates for replacement by PCF | Conditional (NOTE 6) | Yes | UE context |

TABLE 2-1

UE Route Selection Policy (URSP)

| Information name | Description | Category | PCF permitted to modify in a URSP | Scope |
|---|---|---|---|---|
| URSP rules | 1 or more URSP rules as specified in table 6.6.2.1-2 | Mandatory | Yes | UE context |

TABLE 2-2

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

TABLE 2-3

Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |

TABLE 2-3-continued

| Route Selection Descriptor | | | | |
| --- | --- | --- | --- | --- |
| Information name | Description | Category | PCF permitted to modify in URSP | Scope |
| Location Criteria | The UE location where the matching traffic is allowed. The RSD rule is not considered to be valid if the UE location does not match the location criteria. | Optional | Yes | UE context |

TABLE 3

| PDU Session related policy information | | | | |
| --- | --- | --- | --- | --- |
| Attribute | Description | PCF permitted to modify for dynamically provided information | Scope | Differences compared with table 6.4, and 6.6 in TS 23.203 [4] |
| Charging information | Defines the containing CHF address and optionally the associated CHF instance ID and CHF set ID. | No | PDU Session | None |
| Default charging method | Defines the default charging method far the PDU Session. | No | PDU Session | None |
| PDU Session with offline charging only | Indicates that the "online" charging method is never used for PCC rules in the PDU Session. | No | PDU Session | Added |
| Policy control request trigger | Defines the event(s) that shall cause a re-request of PCC rules for the PDU Session. | Yes | PDU Session | Explicitly subscribed by invoking Npcf_SMPolicyControl service operation |
| Authorized QoS per bearer (UE-initiated IP-CAN bearer activation/modification). | Defines the authorised QoS for the IP-CAN bearer (QCI, GBR, MBR). | Yes | IP-CAN bearer | Removed |
| Authorized MBR per QCI (network initiated IP-CAN bearer activation/modification) | Defines the authorised MBR per QCI. | Yes | IP-CAN session | Removed |
| Revalidation time limit | Defines the time period within which the SMF shall perform a PCC rules request. | Yes | PDU Session | None |
| PRA Identifier(s) | Defines the Presence Reporting Area(s) to monitor for the UE with respect to entering/leaving | Yes | PDU Session | None but only applicable to PCF |
| List(s) of Presence Reporting Area elements (NOTE 14) | Defines the elements of the Presence Reporting Area(s) | Yes | PDU Session | None but only applicable to PCF |
| Default NBIFOM access | The access to be used for all traffic that does not match any existing Routing Rule | Yes (only at the addition of an access to the IP-CAN session) | IP-CAN session | Removed |
| IP Index (NOTE 11) | Provided to SMF to assist in determining the IP Address allocation method (e.g. which IP pool to assign from) when a PDU Session requires an IP address - as defined in TS 23.501 [2] clause 5.8.2.2.1. | No | PDU Session | Added |
| Explicitly signalled QoS Characteristics (NOTE 1) | Defines a dynamically assigned 5QI value (from the non-standardized value range) and the associated 5G QoS characteristics as defined in TS 23.501 [2] clause 5.7.3. | No | PDU Session | Added |
| Reflective QoS Timer | Defines the lifetime of a UE derived QoS rule belonging to the PDU Session. | No | PDU Session | Added |

TABLE 3-continued

| | | PDU Session related policy information | | |
|---|---|---|---|---|
| Attribute | Description | PCF permitted to modify for dynamically provided information | Scope | Differences compared with table 6.4, and 6.6 in TS 23.203 [4] |
| Authorized Session-AMBR (NOTE 2) (NOTE 3) | Defines the Aggregate Maximum Bit Rate for the Non-GBR QoS Flows of the PDU Session. | Yes | PDU Session | Modified |
| Authorized default 5QI/ARP (NOTE 3) (NOTE 10) | Defines the default 5QI and ARP of the QoS Flow associated with the default QoS rule. | Yes | PDU Session | Modified |
| Time Condition (NOTE 4) | Defines the time at which the corresponding Subsequent Authorized Session-AMBR or Subsequent Authorized default 5QI/ARP shall be applied. | No (NOTE 5) | PDU Session | Modified |
| Subsequent Authorized Session-AMBR (NOTE 4) (NOTE 2) | Defines the Aggregate Maximum Bit Rate for the Non-GBR QoS Flows of the PDU Session when the Time Condition is reached. | No (NOTE 5) | PDU Session | Modified |
| Subsequent Authorized default 5QI/ARP (NOTE 4) (NOTE 10) | Defines the default 5QI and ARP when the Time Condition is reached. | No (NOTE 5) | PDU Session | Modified |
| Usage Monitoring Control related information (NOTE 12) (NOTE 13) | Defines the information that is required to enable user plane monitoring of resources for individual applications/services, groups of applications/services, for a PDU Session. | | | |
| Monitoring key | The PCF uses the monitoring key to group services that share a common allowed usage. | No | PDU Session (NOTE 12) | None |
| Volume threshold (NOTE 7) | Defines the traffic volume value after which the SMF shall report usage to the PCF for this monitoring key. | Yes | Monitoring key | None |
| Time threshold (NOTE 7) | Defines the resource time usage after which the SMF shall report usage to the PCF. | Yes | Monitoring key | None |
| Monitoring time | Defines the time at which the SMF shall reapply the Volume and/or Time Threshold. | No (NOTE 6) | Monitoring Key | None |
| Subsequent Volume threshold (NOTE 9) | Defines the traffic volume value after which the SMF shall report usage to the PCF for this Monitoring key for the period after the Monitoring time. | No (NOTE 6) | Monitoring Key | None |
| Subsequent Time threshold (NOTE 9) | Defines resource time usage after which the SMF shall report usage to the PCF for this Monitoring key for the period after the Monitoring time. | No (NOTE 6) | Monitoring Key | None |
| Inactivity Detection Time (NOTE 8) | Defines the period of time after which the time measurement shall stop, if no packets are received. | Yes | Monitoring Key | None |
| Ethernet port management related | | | | |
| Port number | Port number for which Port Management Information Container is provided. | Yes | PDU Session | New |
| Port Management Information Container | Includes Ethernet port management information | Yes | PDU Session | New |

The UDM 145 is an NF that stores and manages subscriber information (UE subscription) of the user equipment 100. The UDR 150 is an NF or database (DB) that stores and manages data.

The UDR 150 may store subscription information of the user equipment 100 and provide the subscription information of the user equipment 100 to the UDM 145. In addition, the UDR 150 may store operator policy information and provide the operator policy information to the PCFs 140 and 141.

The NSSF 160 may be an NF that performs a function of selecting network slice instances providing a service to the user equipment 100 or determining Network Slice Selection Assistance Information (NSSAI).

The AUSF 165 may be an NF that performs a function of supporting authentication for 3GPP access and non-3GPP access.

The AF 170 may be an NF that provides a function for a service according to the present disclosure.

The DN 175 may refer to a data network that may provide an operator service, Internet access, or a third party service.

Figure 2:
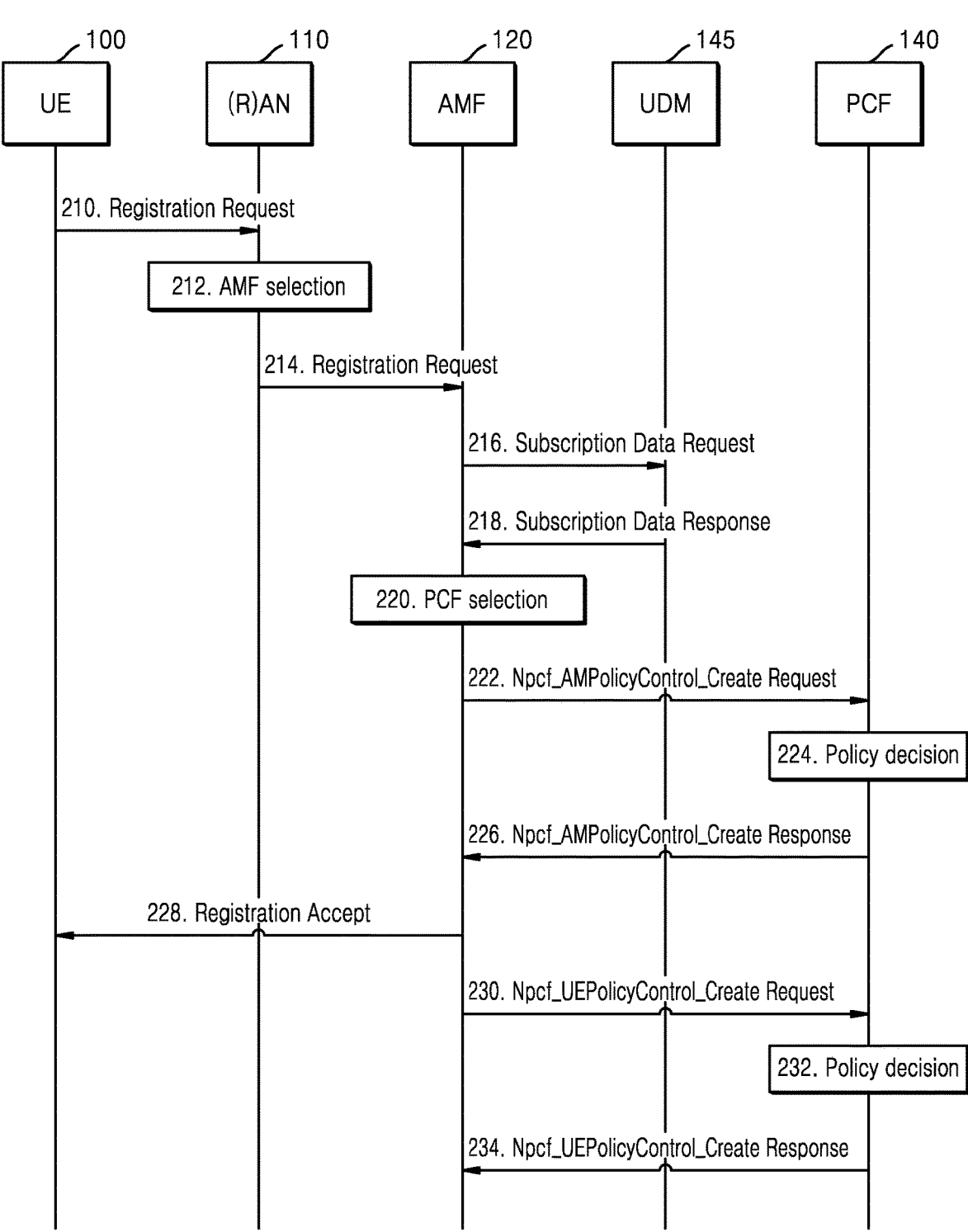
FIG. 2 is a sequence diagram illustrating a user equipment registration procedure according to an embodiment of the present disclosure.

FIG. 2 is a sequence diagram illustrating a user equipment registration procedure according to an embodiment of the present disclosure. FIG. 2 illustrates an operation method of the user equipment 100, the base station 110, the AMF 120, the UDM 145, and the PCF 140.

Referring to FIG. 2, in operation 210, the user equipment 100 may configure a registration request message and transmit the same to the base station 110. According to an embodiment, the registration request message may include a user equipment identifier (e.g., Subscription Permanent Identifier (SUPI), Subscription Concealed Identifier (SUCI), 5G Globally Unique Temporary Identifier (5G GUTI), etc.), a request slice (Requested NSSAI: slice information that the user equipment 100 desires to use by accessing a network), a UE policy container, UE policy-related information (e.g., a first PSI list (a list of PSIS) indicating the UE policy stored in the user equipment 100), and the like. The UE policy container may include UE policy-related information stored in the user equipment 100 (e.g., the first PSI list (a list of PSIS) indicating a UE policy stored in the user equipment 100).

In operation 212, the base station 110 may select an AMF. For example, the base station 110 that has received the registration request message from the user equipment 100 may select an AMF to transmit the message received in operation 210, based on at least one of the information (e.g., Requested NSSAI, user equipment identifier, etc.) received from the user equipment 100 in operation 210.

In operation 214, the base station 110 may transmit the registration request message to the AMF (120). For example, the base station 110 may transmit the registration request message to the AMF 120 selected in operation 212. The AMF 120 may store information received from the user equipment 100, for example, the first PSI list (a list of PSIS) indicating UE policy, which is stored in the user equipment 100. The AMF 120 may store the first PSI list as a UE context.

In operation 216, the AMF 120 may request the UDM 145 for user equipment subscription information (Subscription Data).

In operation 218, the UDM 145 may transmit a response to the user equipment subscription information request to the AMF 120. For example, the AMF 120 may obtain related information of the user equipment 100 from the UDM 145 (e.g., Access and Mobility Subscription data, SMF Selection Subscription data, UE context, subscribed DNNs, subscribed S-NSSAIs, etc.).

In operation 220, the AMF 120 may perform a PCF selection procedure. For example, the AMF 120 may determine to select a PCF that supports a Data Network Name (DNN) replacement function or a URSP replacement function, based on at least one of information received from the user equipment 100, information received from the UDM 145, or a local policy of the AMF 120. In addition, the AMF 120 may select a PCF that supports a DNN replacement function or a URSP replacement function.

In operation 222, the AMF 120 may transmit an Npcf_AMPolicyControl_Create request message to the PCF 140. For example, the AMF 120 may perform AM policy association establishment with the PCF 140 selected in operation 220.

In operation 224, the PCF 140 may determine a policy. For example, the PCF 140 may determine AM policy information to be provided to the AMF 120, based on information received from the AMF 120.

In operation 226, the PCF 140 may transmit an Npcf_AMPolicyControl_Create response message to the AMF 120. In an embodiment, the Npcf_AMPolicy Control_Create response message transmitted from the PCF 140 to the AMF 120 may include AM policy information determined by the PCF 140. The AMF 120 may store the AM policy information received from the PCF 140, and then use the stored AM policy in an operation and procedure of the AMF 120.

In operation 228; the AMF 120 may transmit a Registration Accept message to the user equipment 100. The AMF 120 may include, in the Registration Accept message, slice information (e.g., Allowed NSSAI, etc.) available to the user equipment 100 by accessing a network.

In operation 230, the AMF 120 may transmit an Npcf_U-EPolicyControl_Create request message to the PCF 140. For example; the AMF 120 may perform UE policy association establishment with the PCF 140 that has established AM policy association. The Npcf_UEPolicyControl_Create request message transmitted by the AMF 120 to the PCF 140 may include at least one of a UE policy container or first PSI list information, which are received from the user equipment 100.

In operation 232, the PCF 140 may determine a policy. For example, the PCF 140 may compare the first PSI list among the information received from the AMF 120, with the latest list of PSIs of the user equipment, which is stored in the PCF 140 and/or the UDR 150, which, is a second PSI list. When the first PSI list does not match the second PSI list; the PCF 140 may determine that the user equipment 100 is not storing the latest UE policy information, and determine to transmit the latest UE policy information to the user equipment 100.

According to another embodiment, in operation 232, the PCF 140 may determine to update the UE policy based on the user equipment subscription information, the operator policy, and the like. The PCF 140 may determine the updated UE policy. Also, the PCF 140 may allocate a latest PSI indicating the update UE policy. The latest list of PSIs indicating the updated UE policy is referred to as the second PSI list.

In operation 234, the PCF 140 may transmit an Npcf_U-EPolicyControl_Create response message to the AMF 120. In an embodiment, the Npcf_UEPolicyControl_Create response message transmitted from the PCF 140 to the AMF 120 may include the latest UE policy information of the user equipment 100, that is, the second PSI list. The AMF 120 may store second PSI information received from the PCF 140. For example, the AMF 120 may store the second PSI information as a UE context.

As described above in FIG. 2, the AMF 120 may store the UE policy-related information of the user equipment, for example, at least one of the first PSI list received from the user equipment 100 and the second PSI list received from the PCF 140.

Figure 3:
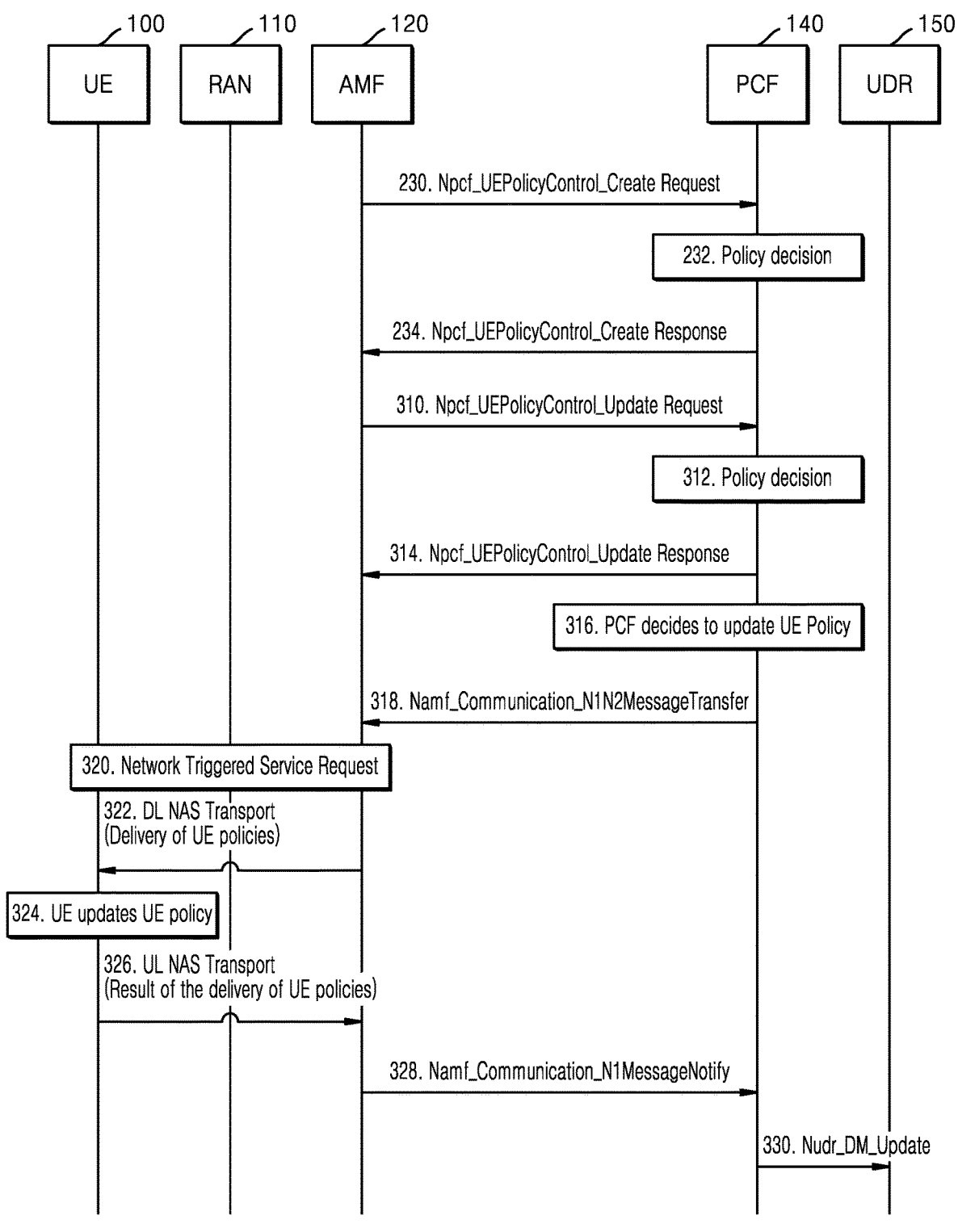
FIG. 3 is a sequence diagram illustrating a UE policy update procedure according to an embodiment of the present disclosure.

FIG. 3 is a sequence diagram illustrating a UE policy update procedure according to an embodiment of the present disclosure.

Referring to FIG. 3, the PCF 140 according to an embodiment of the present disclosure may update a UE policy according to various methods to be described later, and may determine to transmit the updated, latest UE policy to the user equipment 100.

According to an embodiment of the present disclosure, during the registration procedure described above in FIG. 2, the PCF 140 may determine to transmit the latest UE policy to the user equipment 100 during the procedure for UE policy association establishment in operations 230 to 234. For example, in operation 232, the PCF 140 may compare the first PSI list with the second PSI list. When the first PSI list does not match the second PSI list, the PCF 140 may determine that the user equipment 100 is not storing the latest UE policy information, and determine to transmit the latest UE policy information to the user equipment 100. In operation 234, the second PSI list may be included in the Npcf_UEPolicyControl_Create response message transmitted by the PCF 140 to the AMF 120. The AMF 120 may store the received second PSI list. For example, the AMF 120 may store the second PSI information as a UE context.

According to another embodiment, the PCF 140 may determine to transmit the latest UE policy to the user equipment 100 in operation 312. In operation 310, the AMF 120 may transmit an Npcf_UEPolicyControl_Update request message to the PCF 140. The Npcf_UEPolicyControl_Update request message may include location information of the user equipment 100 (e.g., tracking area, Presence Reporting Area, etc.), PLMN information, connection state information of the user equipment 100, and the like. In operation 312, the PCF 140 may determine to update the UE policy based on the information received from the AMF 120, and to transmit the updated, latest UE policy to the user equipment 100. The PCF 140 may determine the updated UE policy and may allocate a latest PSI indicating the updated UE policy. The latest list of PSIs indicating the updated UE policy is referred to as the second PSI list. In operation 314, the PCF 140 may transmit an Npcf_UEPolicyControl_Update response message to the AMF 120. The Npcf_UEPolicyControl_Update response message may include the second PSI list. The AMF 120 may store the received second PSI list. For example, the AMF 120 may store the second PSI list as a UE context.

According to another embodiment, the PCF 140 may determine to transmit the latest UE policy to the user equipment 100 in operation 316. For example, in operation 316, the PCF 140 may determine to update the UE policy based on an operator policy, user equipment subscription information, and the like. The PCF 140 may determine the updated UE policy and may allocate the latest PSI indicating the updated UE policy. The latest list of PSIs indicating the updated UE policy is referred to as the second PSI list.

As described above, the PCF 140 may determine to update the UE policy according to various methods and transmit the updated, latest UE policy to the user equipment 100. For convenience of description of the present disclosure, the operations of the PCF 140 in operations 232 and 312 to 316 have been described separately, but the operations of the PCF 140 may occur simultaneously. That is, the UE policy update-related decision by the PCF 140 may be determined based on one or more of information received from the user equipment 100, information received from the AMF 120, user equipment subscription information, and operator policy. Operations 318 to 330 described below describe a procedure for transmitting, by the PCF 140, the updated, latest UE policy to the user equipment 100.

In operation 318, the PCF 140 may transmit a Namf_Communication_N1N2MessageTransfer message to the AMF 120.

Namf_Communication_N1N2MessageTransfer may include the UE policy of the user equipment 100 determined by the PCF 140. In addition, Namf_Communication_N1N2MessageTransfer may include a second PSI list indicating the UE policy of the user equipment 100. The AMF 120 may store the second PSI list received from the PCF 140. For example, the AMF 120 may store the second PSI list as a UE context.

In operation 320, when the user equipment 100 is in an idle mode, the AMF 120 may perform a Network Triggered Service Request procedure to wake up the user equipment.

When the user equipment is woken up in operation 320, operation 322 may be performed.

When it is not possible to wake up the user equipment in operation 320, operations 322 to 326 may be omitted, and the AMF 120 may transmit a Namf_Communication_N1N2MessageNotify message of operation 328. The Namf_Communication_N1N2MessageNotify message may include information indicating that the user equipment 100 is not reachable or unreachable or information indicating that the user equipment 100 is not connected. Upon receiving the Namf_Communication_N1N2MessageNotify message, the PCF 140 may know that the UE policy transmitted in operation 318 has not been transmitted to the user equipment 100.

In operation 322, the AMF 120 may transmit a DL Non Access Stratum (NAS) Transport message to the user equipment 100. The DL NAS Transport message may include the UE policy information and the second PSI list received by the AMF 120 from the PCF 140 in operation 318.

In operation 324, the user equipment 100 may store the UE policy information and the second PSI list received in operation 322. In addition, the user equipment 100 may apply the received UE policy information. The user equipment 100 may determine when to apply the received UE policy. For example, the user equipment 100 may determine to apply the UE policy immediately upon receiving. Alternatively, the user equipment 100 may determine to apply the UE policy in an idle mode. Alternatively, the user equipment 100 may determine to apply the UE policy after one or more protocol data unit (PDU) sessions that are currently in use are ended. However, the present disclosure is not limited to the above example.

In operation 326, the user equipment 100 may transmit a UL NAS Transport message to the AMF 120. For example, after receiving the DL NAS Transport message in operation 322, the user equipment 100 may transmit a UL NAS Transport message. The UL NAS Transport message may include information indicating that the user equipment 100 has received the UE policy. In addition, the UL NAS Transport message may include the second PSI list indicating the UE policy received by the user equipment 100. The AMF 120 may store a PSI list received from the user equipment 120. For example, the AMF 120 may store the PSI list as a PSI list received by the user equipment, in the UE context.

According to another embodiment, after applying the UE policy in operation 324, the user equipment 100 may transmit the UL NAS Transport message in operation 326. The UL NAS Transport message may include information indicating that the user equipment 100 has applied the UE policy. In addition, the UL NAS Transport message may include the second PSI list indicating a UE policy applied or not applied by the user equipment 100 and/or one or more PSIS among the second PSI list. The AMF 120 may store the PSI list received from the user equipment 100. For example, the AMF 120 may store the PSI list as a PSI list, to which a policy is applied by the user equipment, in the UE context. Alternatively, the AMF 120 may store the corresponding PSI list in the UE context as a PSI list to which the user equipment does not apply a policy.

When the user equipment applies the received UE policy in operation 324, the user equipment 100 may apply all the received UE policies. Alternatively, the user equipment 100 may apply some of the received UE policies, and may not apply some of the remaining UE policies. Alternatively, the user equipment 100 may not be able to apply all of the received UE policies. Accordingly, after the user equipment 100 has applied the UE policy in operation 324, in terms of transmitting the UL NAS Transport message in operation 326, the user equipment 100 may include, in the UL NAS Transport message, UE policy information, to which the user equipment 100 has applied a policy (e.g., one or more pieces of PSI information to which a policy is applied among the second PSI list received in operation 322). Alternatively, the user equipment 100 may include, in the UL NAS Transport message, UE policy information to which the user equipment 100 has failed to apply a policy (e.g., one or more pieces of PSI information to which the policy is not applied among the second PSI list received in operation 322).

In operation 328, the AMF 120 may transmit a Namf_Communication_N1Notify message to the PCF 140. The Namf_Communication_N1Notify message may include information indicating that the user equipment 100 has received the UE policy, information indicating that the user equipment 100 has applied the UE policy, and information indicating that the user equipment 100 has failed to apply the UE policy. In addition, the Namf_Communication_N1Notify message may include the second PSI list received from the user equipment 100 and/or one or more PSIs of the second PSI list. Upon receiving the message in operation 328, the PCF 140 may determine whether the user equipment 100 has successfully received the latest UE policy transmitted in operation 318, and whether or not the user equipment 100 has applied the latest UE policy.

In operation 330, the PCF 140 may store, in the UDR 150, the latest UE policy that the user equipment 100 has successfully received and applied, and the latest PSI list indicating the UE policy, that is, the second PSI list and/or at least one PSI of the second PSI list.

Figure 4:
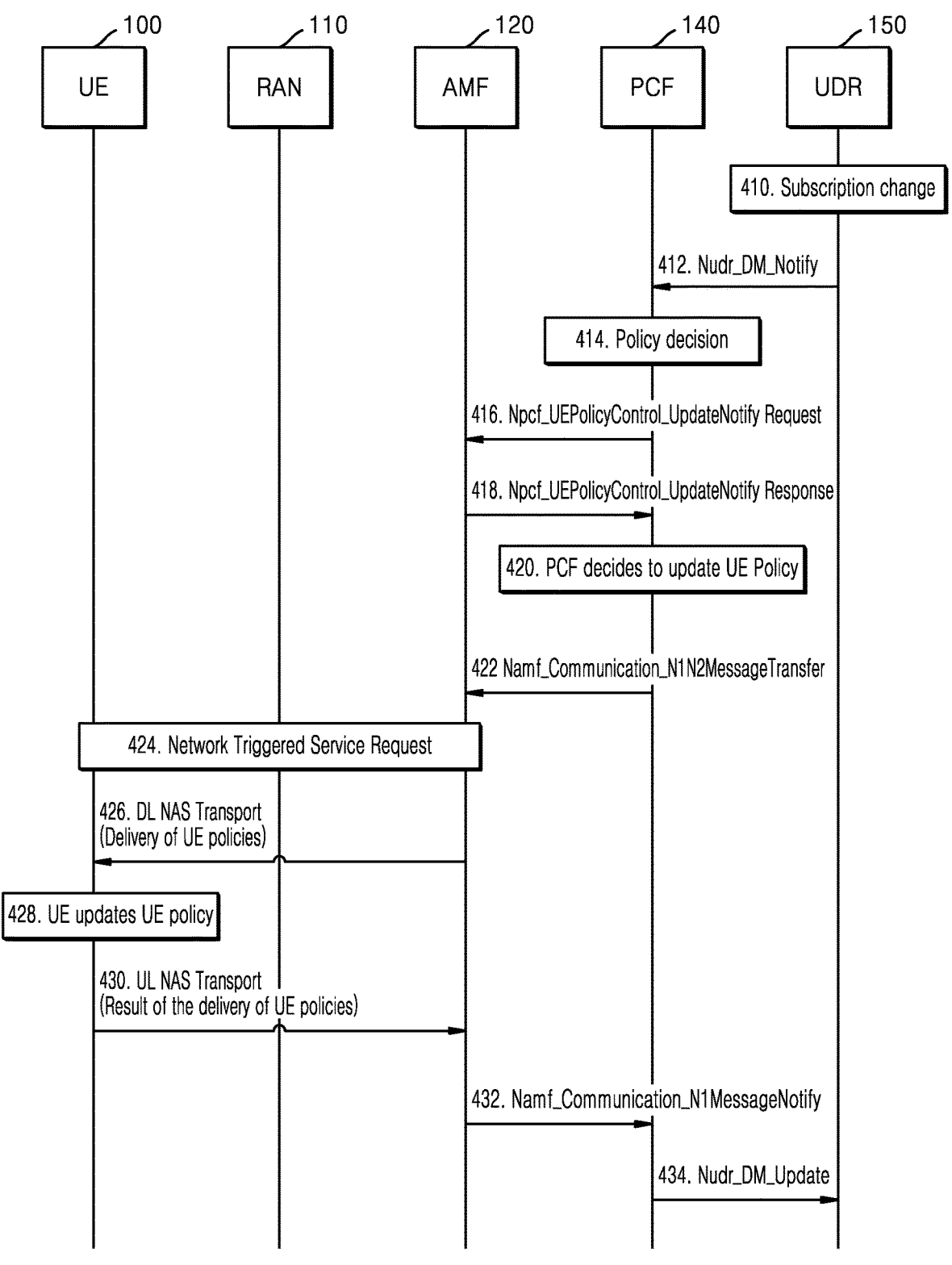
FIG. 4 is a sequence diagram illustrating a UE policy update procedure according to an embodiment of the present disclosure.

FIG. 4 is a sequence diagram illustrating a UE policy update procedure according to an embodiment of the present disclosure.

Referring to FIG. 4, in operation 410, a change may occur in user equipment subscription information stored in the UDR 150.

In operation 412, the UDR 150 may transmit a Nudr_DM_Notify message to the PCF 140. The Nudr_DM_Notify message may include changed user equipment subscription information. For example, the Nudr_DM_Notify message may include at least one of S-NSSAI, DNN, SSC mode, or PDU session type, to which the user equipment subscribes.

In operation 414, the PCF 140 may determine to update the UE policy based on the UE subscription information received from the UDR 150. The PCF 140 may determine the updated UE policy and may allocate the latest PSI indicating the updated UE policy. The latest list of PSIs indicating the updated UE policy may be referred to as the second PSI list.

In operation 416, the PCF 140 may transmit an Npcf_U-EPolicyControl_UpdateNotify request message to the AMF 120. The Npcf_UEPolicyControl_UpdateNotify request message may include the second PSI list. The AMF 120 may store the second PSI list received from the PCF 140. For example, the AMF 120 may store the second PSI list as a UE context.

In operation 418, the AMF 120 may transmit an Npcf_U-EPolicyControl_UpdateNotify response message to the PCF 140.

In operation 420, the PCF 140 may determine to transmit the updated, latest policy to the user equipment 100.

In operation 422, the PCF 140 may transmit a Namf_Communication_N1N2MessageTransfer message to the AMF 120. The Namf_Communication_N1N2MessageTransfer may include the UE policy of the user equipment 100, determined by the PCF 140. In addition, Namf_Communication_N1N2MessageTransfer may include the second PSI list indicating the UE policy of the user equipment 100. The AMF 120 may store the second PSI list received from the PCF 140. For example, the AMF 120 may store the second PSI list as a UE context.

In operation 424, when the user equipment 100 is in an idle mode, the AMF 120 may perform a Network Triggered Service Request procedure to wake up the user equipment.

When the user equipment is woken up in operation 424, operation 426 may be performed.

When it is not possible to wake up the user equipment in operation 424, operations 426 to 430 may be omitted, and the AMF 120 may transmit a Namf_Communication_N1N2MessageNotify message of operation 432. The Namf_Communication_N1N2MessageNotify message may include information indicating that the user equipment 100 is not reachable or unreachable or information indicating that the user equipment 100 is not connected, Upon receiving the Namf_Communication_N1N2MessageNotify message, the PCF 140 may know that the UE policy transmitted in operation 422 has not been transmitted to the user equipment 100.

In operation 426, the AMF 120 may transmit a DL NAS Transport message to the user equipment 100. The DL NAS Transport message may include the UE policy information and the second PSI list received by the AMF 120 from the PCF 140 in operation 422.

In operation 428, the user equipment 100 may store the UE policy information and the second PSI list received in operation 426. In addition, the user equipment 100 may apply the received UE policy information. The user equipment 100 may determine when to apply the received UE policy. For example, the user equipment 100 may determine to apply the UE policy immediately upon receiving. Alternatively, the user equipment 100 may determine to apply the UE policy in an idle mode. Alternatively, the user equipment 100 may determine to apply the UE policy after one or more PICU sessions that are currently in use are ended. However, the present disclosure is not limited to the above example.

In operation 430, the user equipment 100 may transmit a UL NAS Transport message to the AMF 120. For example, after receiving the DL NAS Transport message in operation 426, the user equipment 100 may transmit a UL NAS Transport message. The UL NAS Transport message may include information indicating that the user equipment 100 has received the UE policy. In addition, the UL NAS Transport message may include the second PSI list indicating the UE policy received by the user equipment 100. The AMF 120 may store the PSI list received from the user equipment 100. For example, the AMF 120 may store the PSI list as a PSI list received by the UE, in the UE context.

According to another embodiment, after applying the UE policy in operation 428, the user equipment 100 may transmit the UL NAS Transport message in operation 430. The UL NAS Transport message may include information indicating that the user equipment 100 has applied the UE policy. In addition, the UL NAS Transport message may include the second PSI list indicating a UE policy applied or not applied by the user equipment 100 and/or one or more PSIs of the second PSI list. The AMF 120 may store the PSI list received from the user equipment 100. For example, the AMF 120 may store the PSI list as a PSI list, to which a policy is applied by the user equipment, in the UE context. Alternatively, the AMF 120 may store the corresponding PSI list in the UE context as a PSI list to which the user equipment does not apply a policy.

When the user equipment applies the received UE policy in operation 428, the user equipment 100 may apply all the received UE policies. Alternatively, the user equipment 100 may apply some of the received UE policies, and may not apply some of the remaining UE policies. Alternatively, the user equipment 100 may not be able to apply all of the received UE policies. Accordingly, after the user equipment 100 has applied the UE policy in operation 428, in terms of transmitting the UL NAS Transport message in operation 430, the user equipment 100 may include, in the UL NAS Transport message, UE policy information, to which the user equipment 100 has applied a policy (e.g., one or more pieces of PSI information to which a policy is applied among the second PSI list received in operation 426). Alternatively, the user equipment 100 may include, in the UL NAS Transport message, UE policy information to which the user equipment 100 has failed to apply a policy (e.g., one or more pieces of PSI information to which the policy is not applied among the second PSI list received in operation 426).

In operation 432, the AMF 120 may transmit a Namf_Communication_N1Notify message to the PCF 140. The Namf_Communication_N1Notify message may include information indicating that the user equipment 100 has received the UE policy, information indicating that the user equipment 100 has applied the UE policy, and information indicating that the user equipment 100 has failed to apply the UE policy. In addition, the Namf_Communication_N1Notify message may include the second PSI list received from the user equipment 100 and/or one or more PSIs among the second PSI list, Upon receiving the message in operation 432, the PCF 140 may determine whether the user equipment 100 has successfully received the latest UE policy transmitted in operation 422 and whether or not the user equipment 100 has applied the latest UE policy.

In operation 434, the PCF 140 may store, in the UDR 150, the latest UE policy that the user equipment 100 has successfully received and applied, and a latest PSI list indicating the UE policy, that is, the second PSI list and/or one or more PSIs among the second PSI list.

Figure 5:
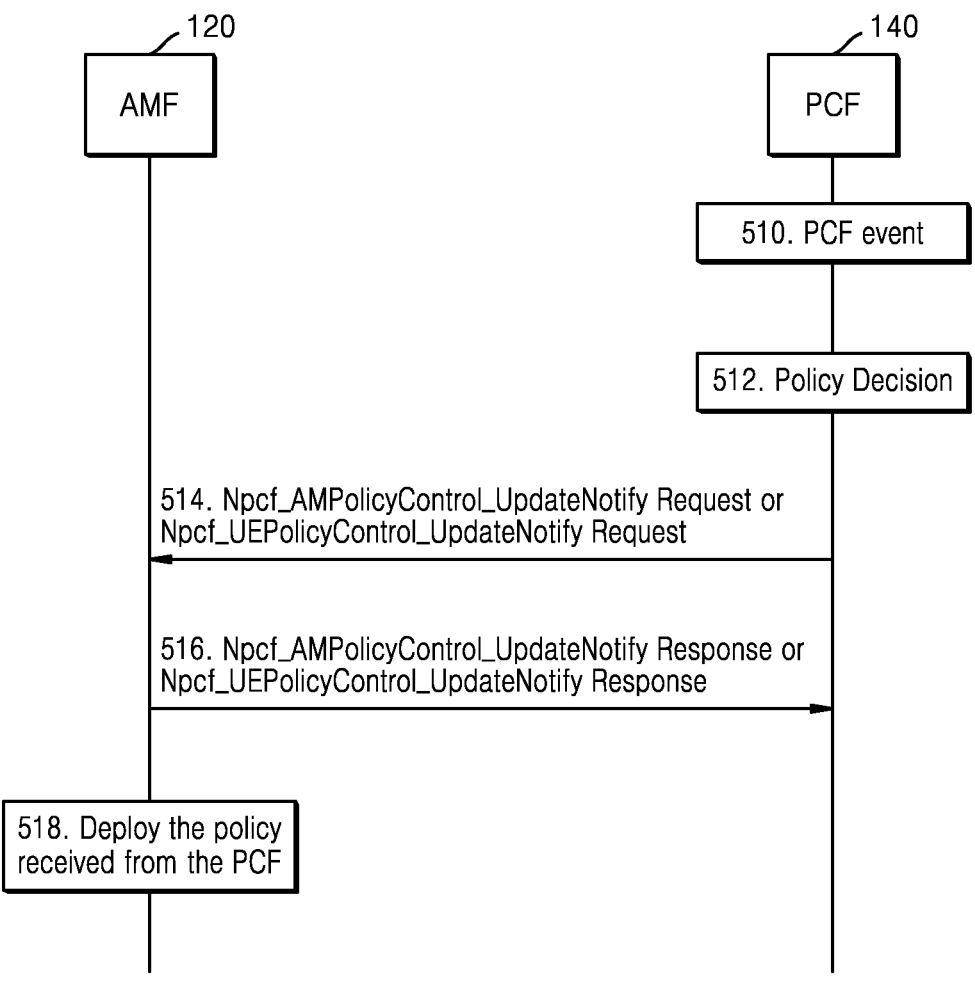
FIG. 5 is a sequence diagram illustrating a policy update procedure according to an embodiment of the present disclosure.

FIG. 5 is a sequence diagram illustrating a policy update procedure according to an embodiment of the present disclosure.

Referring to FIG. 5, an event of the PCF 140 (a PCF event) may occur in operation 510. For example, after transmitting the latest UE policy to the user equipment 100 in operation 234 of FIG. 2, operation 314, operation 318 of FIG. 3, operation 416 or 422 of FIG. 4, the PCF 140 may perform operations subsequent to operation 512. Alternatively, for example, as described above with reference to FIGS. 3 to 4, the PCF 140 may know that the user equipment 100 failed to receive the latest UE policy transmitted to the user equipment 100 or the user equipment 100 failed to apply at least some of the latest UE policies. That is, the PCF 140 may know that a mismatch has occurred between the user equipment subscription information stored in the UDR 150 and at least some of the UE policies applied by the user equipment 100. For example, the user equipment subscription information stored in the UDR 150 may include DNN A as a subscribed DNN, but the user equipment 100 may not apply DNN A as a UE policy. Alternatively, while DNN B is not included as a subscribed DNN in the user equipment subscription information stored in the UDR 150, the user equipment 100 may apply DNN B as a UE policy.

In operation 512, the PCF 140 may make a policy decision for resolving the mismatch between the user equipment subscription information and the UE policy application determined in operation 510. [Table 4] illustrates examples of policies determined by the PCF 140 in operation 512.

TABLE 4

| Policy control information | | | | |
|---|---|---|---|---|
| Information name | Description | Category | PCF permitted to modify in a UE context in the AMF | Scope |
| DNN replacement of unsupported DNNs | Defines if a UE requested unsupported DNN is requested for replacement by PCF | Conditional (NOTE 6) | Yes | UE context |
| List of S-NSSAIs | Defines the list of S-NSSAIs containing DNN candidates for replacement by PCF | Conditional (NOTE 6) (NOTE 7) | Yes | UE context |
| Per S-NSSAI: List of DNNs | Defines UE requested DNN candidates for replacement by PCF | Conditional (NOTE 6) | Yes | UE context |
| For each DNN in S-NSSAI level: SSC modes | Indicates the allowed SSC modes for the DNN, S-NSSAI. | Conditional | Yes | UE context |

TABLE 4-continued

| Policy control information | | | | |
| Information name | Description | Category | PCF permitted to modify in a UE context in the AMF | Scope |
| --- | --- | --- | --- | --- |
| For each DNN in S-NSSAI level: PDU Session Types | Indicates the allowed PDU Session Types (IPv4, IPv6, IPv4v6, Ethernet, and Unstructured) for the DNN, S-NSSAI. | Conditional | Yes | UE context |

In operation 514, the PCF 140 may transmit an Npcf_AMPolicyControl_UpdateNotify Request message and/or an Npcf_UEPolicyControl_UpdateNotify Request message to the AMF 120. The Npcf_AMPolicyControl_UpdateNotify Request message and/or the Npcf_UEPolicyControl_UpdateNotify Request message may include the policies determined by the PCF 140 in operation 512.

In operation 516, the AMF 120 may transmit an Npcf_AMPolicyControl_UpdateNotify Response message and/or an Npcf_UEPolicyControl_UpdateNotify Response message to the PCF 140.

In operation 518, the AMF 120 may apply the policies received from the PCF 140 in operation 514. The policy application method in operation 518 will be described in detail with reference to FIG. 7.

Figure 6:
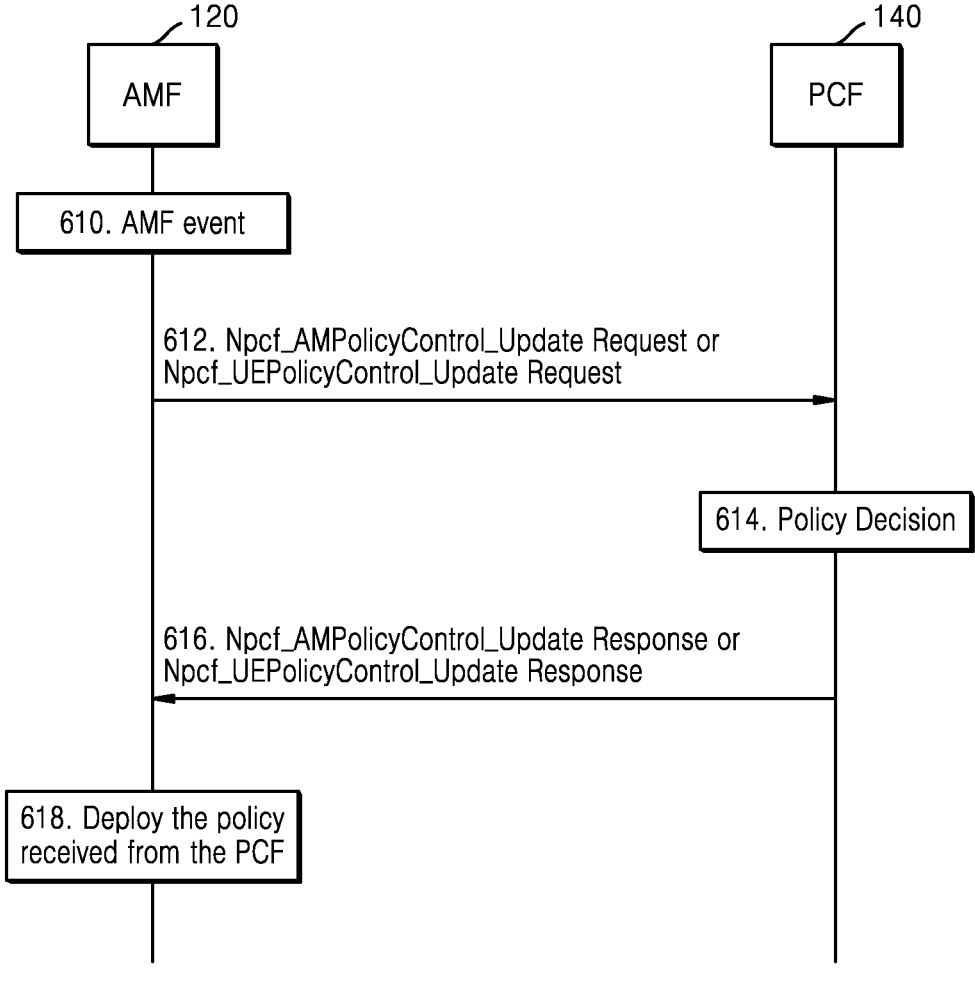
FIG. 6 is a sequence diagram illustrating a policy update procedure according to an embodiment of the present disclosure.

FIG. 6 is a sequence diagram illustrating a policy update procedure according to an embodiment of the present disclosure.

Referring to FIG. 6, an event of the AMF 120 (an AMF event) may occur in operation 610. For example, for example, as described above with reference to FIGS. 3 to 4, the AMF 120 may know that the user equipment 100 failed to receive the latest UE policy transmitted to the user equipment 100 or the user equipment 100 failed to apply at least some of the latest UE policies, That is, the AMF 120 may know that a mismatch has occurred between the user equipment subscription information stored in the UDR 150 and the UE policies applied by the user equipment 100. For example, the user equipment subscription information stored in the UDR 150 may include DNN A as a subscribed DNN, but the user equipment 100 may not apply DNN A as a UE policy. Alternatively, while DNN B is not included as a subscribed DNN in the user equipment subscription information stored in the UDR 150, the user equipment 100 may apply DNN B as a UE policy.

In operation 612, the AMF 120 may transmit an Npcf_AMPolicyControl_Update Request message and/or an Npcf_UEPolicyControl_Update Request message to the PCF 140 in order to resolve the mismatch between the user equipment subscription information and the UE policy application, determined in operation 610. The Npcf_AMPolicyControl_Update Request message and/or the Npcf_UEPolicyControl_Update Request message may include information indicating the mismatch between user equipment subscription information and the UE policy application and/or information requesting URSP replacement.

In operation 614, the PCF 140 may make a policy decision for resolving the mismatch between user equipment subscription information and the UE policy application. [Table 4] shows examples of the policies determined by the PCF 140 in operation 512.

In operation 616, the PCF 140 may transmit an Npcf_AMPolicyControl_Update Response message and/or an Npcf_UEPolicyControl_Update Response message to the AMF 120. The Npcf_AMPolicyControl_Update Response message and/or the Npcf_UEPolicyControl_Update Response message may include the policies determined by the PCF 140 in operation 614.

In operation 618, the AMF 120 may apply the policies received from the PCF 140 in operation 616. The policy application method in operation 618 will be described in detail with reference to FIG. 7.

Figure 7:
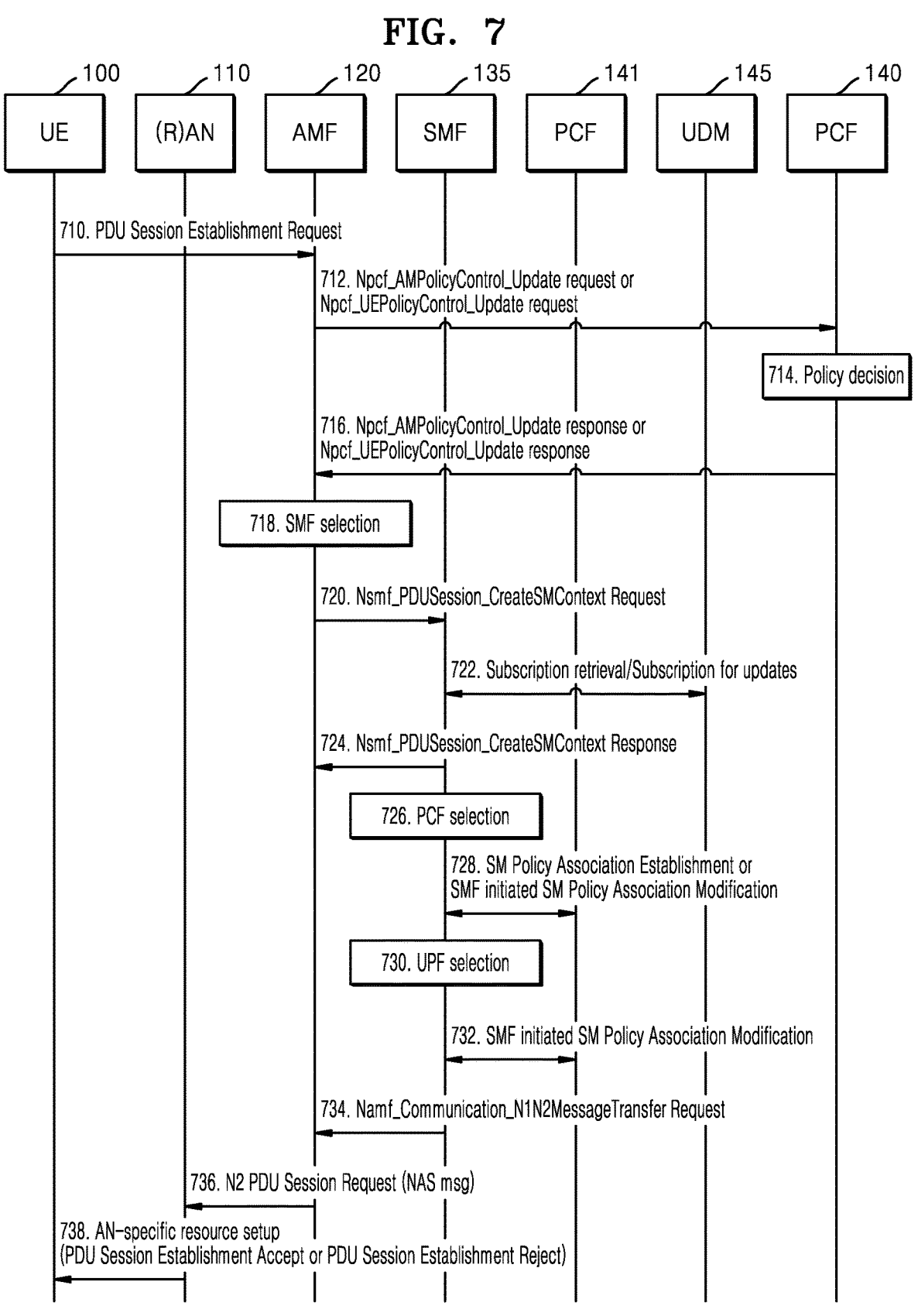
FIG. 7 is a sequence diagram illustrating a PDU session establishment procedure according to an embodiment of the present disclosure.

FIG. 7 is a sequence diagram illustrating a PDU session establishment procedure according to an embodiment of the present disclosure. FIG. 7 illustrates an operating method of the user equipment 100, the base station 110, the AMF 120, the SMF 135, the PCFs 140, 141, and the UDM 145, In an embodiment, the PCFs 140, 141 may be divided into the PCF 140 responsible for Access and Mobility (AM) policy and UE policy and the PCF 141 for Session Management (SM) policy. The PCF 140 and the PCF 141 may be logically or physically separated NFs or may be logically or physically one single NF.

According to an embodiment of the present disclosure, in operation 710, the user equipment 100 may transmit a PDU Session Establishment Request message to the AMF 120, The PDU Session Establishment Request message may include at least one among DNN, S-NSSAI, SSC mode, and PDU session type determined by the user equipment 100 based on the UE policy applied by the user equipment 100 by using the method described with reference to FIGS. 3 to 4. In addition, the PDU Session Establishment Request message may include a PSI referred by the user equipment 100 to determine the DNN, S-NSSAI, SSC mode, PDU session type, etc, determined by the user equipment 100 based on the UE policy applied by the user equipment 100.

The AMF 120 may compare the PSI list stored in the AMF 120 with the PSI received from the user equipment 100 in operation 710.

When the PSI received in operation 710 is included in the PSI list stored in the AMF 120 (the latest PSI list), the AMF 120 may know that the user equipment 100 has applied a valid UE policy, and perform operation 712 and subsequent operations.

When the PSI received in operation 710 is a value that is not included in the PSI list stored in the AMF 120 (the latest PSI list), the AMF 120 may know that the user equipment 100 has applied an invalid UE policy and reject the request from the user equipment in operation 710. That is, the AMF 120 may transmit a PDU Session Establishment Reject message to the user equipment 100. The PDU Session Establishment Reject message may include a cause value indicating a reason the request was rejected, and the cause value may include a value indicating that the user equipment 100 did not use a valid UE policy (e.g., PSI is not valid, not valid). PSI, etc.). Upon receiving the PDU Session Establishment Reject message, the user equipment 100 may know the reason for rejection based on the cause value included in the received message. For example, when the cause value includes a value indicating that the user equipment 100 did not use a valid UE policy, the user equipment 100 may determine that that the UE policy that is currently used by the user equipment 100 is not the latest UE policy, and may perform a user equipment registration procedure in order to receive the latest UE policy. Alternatively, the user equipment 100 may apply a UE policy that has been received in operation 322 of FIG. 3 or in operation 426 of FIG. 4 but has not yet been applied. The user equipment 100 may perform the registration procedure to receive the latest UE policy or, after applying the previously received UE policy, may perform the PDU session establishment procedure of FIG. 7 again based on the applied latest UE policy.

According to another embodiment of the present disclosure, in operation 710; the user equipment 100 may transmit the PDU Session Establishment Request message to the AMF 120. The PDU Session Establishment Request message may include at least one among DNN, S-NSSAI, SSC mode, and PDU session type determined by the user equipment 100 based on the UE policy applied by the user equipment 100 by using the method described with reference to FIGS. 3 to 4.

The AMF 120 may determine whether to carry out URSP replacement, based on at least one of information received from the user equipment 100 in operation 710, information received from the PCF 140 in operation 514 of FIG. 5, information received from the PCF 140 in operation 616 of FIG. 6, local configuration information of the AMF 120, or mobile operator policy information. For example, when the AMF 120 has received the policy illustrated in [Table 4] from the PCF 140 in operation 514 of FIG. 5 and/or operation 616 of FIG. 6, and at least one of the DNN S-NSSAI, SSC mode, or PDU session type received from the user equipment 100 in operation 710 is included in the policy illustrated in [Table 4], the AMF 120 may determine to perform URSP replacement. That is, the policy received from the PCF 140 in operation 514 of FIG. 5 and/or operation 616 of FIG. 6 may include UE policy-related information which is transmitted by the PCF 140 to the user equipment 100, but which the user equipment 100 failed to receive or apply. For example, the corresponding policy may include a previous UE policy corresponding to the latest UE policy which the user equipment 100 failed to apply. Accordingly, at least one of DNN, S-NSSAI, SSC mode, or PDU session type being received from the user equipment 100 and included in the corresponding policy received from the PCF 140 may indicate that the user equipment 100 used the previous UE policy instead of using the latest UE policy. The AMF 120 may determine to perform URSP replacement because the user equipment 100 did not use the latest UE policy.

According to an embodiment, the AMF 120 that has determined to perform the URSP replacement may perform operation 712 described below, to request the PCF 140 for the URSP replacement, the PCF 140 having established AM policy association or UE policy association with the AMF 120.

In operation 712, the AMF 120 may transmit an Npcf_AMPolicyControl_Update request message and/or an Npcf_UEPolicyControl_Update request message to the PCF 140. The Npcf_AMPolicyControl_Update request message or the Npcf_UEPolicyControl_Update request message may include at least one of a requested DNN, a requested S-NSSAI, a requested SSC mode, or a requested PDU session type received from the user equipment 100 in operation 710.

In operation 714, the PCF 140 may determine a policy. For example, the PCF 140 may determine a URSP replacement policy based on the information received from the AMF 120, local configuration information of the PCF 140, operator policy information, the latest UE policy of the user equipment 100, determined in operation 232 of FIG. 2, operation 312 of FIG. 3, and/or operations 414 to 420 of FIG. 4. For example, the PCF 140 may determine a selected DNN to replace the requested DNN. Alternatively, the PCF 140 may determine a selected S-NSSAI to replace the requested S-NSSAI. Alternatively, the PCF 140 may determine a selected SSC mode to replace the requested SSC mode. Alternatively, the PCF 140 may determine a selected PDU session type to replace the requested PDU session type. The selected DNN, selected S-NSSAI, selected SSC mode, and selected PDU session type may be information included in the latest UE policies determined by the PCF 140 for the user equipment 100.

In operation 716, the PCF 140 may transmit an Npcf_AMPolicyControl_Update response message and/or an Npcf_UEPolicyControl_Update response message to the AMF 120. The Npcf_AMPolicyControl_Update response message and/or the Npcf_UEPolicyCtonrol_Update response message may include at least one of the selected DNN, selected S-NSSAI, selected SSC mode, or selected PDU session type determined by the PCF 140 in operation 714. The AMF 120 that has received the Npcf_AMPolicyControl_Update response message and/or the Npcf_UEPolicyCtonrol_Update response message may store the information received from the PCF 140. For example, the AMF 120 may store the information in association with a PDU session (for example, referred to as a PDU session ID).

In operation 718, the AMF 120 may select an SMF. For example, the AMF 120 may process a PDU session establishment by using information received from the PCF 140 (e.g., selected DNN, selected S-NSSAI, selected SSC mode, selected PDU session type) instead of information received from the user equipment 100 (e.g., requested DNN, requested S-NSSAI, requested SSC mode, requested PDU session type). For example, the AMF 120 may select an SMF supporting the selected DNN.

In operation 720, the AMF 120 may transmit a Nsmf_PDUSession_CreateSMContext Request message to the selected SMF 135. The Nsmf_PDUSession_CreateSMContext Request message may include at least one of information requested by the user equipment 100 (e.g., requested DNN, requested S-NSSAI, requested SSC mode, requested PDU session type), information determined by the PCF 140 (e.g., selected DNN, selected S-NSSAI), selected SSC mode, selected PDU session type). The information requested by the user equipment 100 (e.g., requested DNN, requested S-NSSAI, requested SSC mode, requested PDU session type) may be information included in the PDU Session Establishment Request included in an SM Container included in the Nsmf_PDUSession_CreateSMContext Request or a Nsmf_PDUSession_UpdateSMContext Request message in operation 720. The information determined by the PCF 140 (e.g., selected DNN, selected S-NSSAI, selected SSC mode, selected PDU session type) may be information included in the Nsmf_PDUSession_CreateSMContext Request to Nsmf_PDUSession_UpdateSMContext Request message of operation 720. The SMF 135 may proceed with the PDU session establishment procedure as follows by using the information received from the AMF 120.

In operation 722, the SMF 135 may obtain Session Management Subscription Data from the UDM 145. The SMF 135 may authenticate a PDU session establishment request based on the information received from the AMF 120 and the subscription data obtained from the UDM 145.

The SMF 135 may proceed with a subsequent PDU session establishment procedure based on the information received from the AMF 120. The information received from the AMF 120 may include at least one of the information requested by the user equipment 100 (e.g., requested DNN, requested S-NSSAI, requested SSC mode, requested PDU session type) and the information determined by the PCF 140 (e.g., selected DNN, selected S-NSSAI, selected SSC mode, selected PDU session type), In this case, the SMF 135 may proceed with the subsequent PDU session establishment procedure based on the information received from the AMF 120.

The information received from the AMF 120 may include both the information requested by the user equipment 100 (e.g., requested DNN, requested S-NSSAI, requested SSC mode, requested PDU session type) and the information determined by the PCF 140 (e.g., selected DNN, selected S-NSSAI, selected SSC mode, selected PDU session type), In this case, among the information received from the AMF 120, the SMF 135 may determine priorities of the information requested by the user equipment 100 (e.g., requested DNN, requested S-NSSAI, requested SSC mode, requested PDU session type) and the information determined by the PCF 140 (e.g., selected DNN, selected S-NSSAI), selected SSC mode, and selected PDU session type). The SMF 135 may proceed with, based on the priority determination, the subsequent PDU session establishment procedure by using at least one of the information requested by the user equipment 100 or the information determined by the PCF 140.

According to an embodiment, the SMF 135 may determine priorities based on an operator policy (local policy) configured in the SMF 135. For example, the SMF 135 may proceed with the subsequent PDU session establishment procedure by using the information determined by the PCF 140 according to the operator policy. Alternatively, for example, the SMF 135 may proceed with the subsequent PDU session establishment procedure by using the information requested by the user equipment 100 according to the operator policy.

According to another embodiment, the SMF 135 may determine priorities based on the information received from the UDM 145 in operation 722 or the information received from the AMF 120 in operation 720. For example, the subscription data received from the UDM 145 in operation 722 may include an indicator indicating to use user equipment-requested information or an indicator indicating to use network (e.g., PCF, AMF, etc.) determination information. Alternatively, for example, the message received from the AMF 120 in operation 720 may include an indicator indicating to use user equipment-requested information or an indicator to use network (e.g., PCF, AMF, etc.) determination information. When receiving, from the AMF 120, an indicator indicating to use the user equipment-requested information or an indicator to use the network (e.g., PCF, AMF, etc.) determination information decision information, the SMF 135 may determine priorities based on at least one of the operator policy configured in the AMF 120, the subscription data received by the AMF 120 from the UDM 145, or policy information received by the AMF 120 from the PCF 140. The operator policy configured in the AMF 120 may include priority between the user equipment-requested information and the network (e.g., PCF, AMF, etc.) determination information. The subscription data received by the AMF 120 from the UDM 145 or the policy information received by the AMF 120 from the PCF 140 may include an indicator indicating to use user equipment-requested information or an indicator indicating to use network (e.g., PCF, AMF, etc.) determination information.

According to another embodiment, the SMF 135 may determine to preferentially use information requested by the user equipment 100 (e.g., requested DNN, requested S-NSSAI, requested SSC mode, requested PDU session type). The SMF 135 may perform, based on the priority determination, a subsequent PDU session establishment procedure by using the information requested by the user equipment 100.

According to another embodiment, the SMF 135 may determine to preferentially use the information determined by the PCF 140 (e.g., selected DNN, selected S-NSSAI, selected SSC mode, selected PDU session type). The SMF 135 may perform, based on the priority determination, a subsequent PDU session establishment procedure by using information determined by the PCF 140.

According to an embodiment of the present disclosure, the information received by the SMF 135 from the AMF 120 may include DNN A as a requested DNN and DNN B as a selected DNN. Also, a subscribed DNN of the user equipment subscription information received by the SMF 135 from the UDM 145 does not include DNN A but include DNN B. In this case, the SMF 135 may determine that the DNN requested by the user equipment is not included the user equipment subscription information, but the DNN replaced by the PCF 140 is included in the user equipment subscription information, and perform a subsequent procedure by using the DNN replaced by the PCF 140.

According to another embodiment, the information received by the SMF 135 from the AMF 120 may include DNN A as a requested DNN and DNN B as a selected DNN. Also, a subscribed DNN of the user equipment subscription information received by the SMF 135 from the UDM 145 does not include DNN A but include DNN B. The SMF 135 may perform a subsequent PDU session establishment procedure by using at least one of information requested by the user equipment 100 or information determined by the PCF 140, based on priorities of the information requested by the user equipment 100 (requested DNN) and the information determined by the PCF 140 (selected DNN). For example, when it is determined to use the information requested by the user equipment 100, because DNN A, which is the requested DNN, is not included in the user equipment subscription information, the SMF 135 may determine that the request is not a valid request, and determine to reject the PDU session establishment request. Alternatively, for example, when it is determined to use the information determined by the PCF 140, because DNN B, which is the selected DNN, is included in the user equipment subscription information, the SMF 135 may determine that the request is a valid request, and determine to accept the PDU session establishment request.

According to an embodiment of the present disclosure, the information received by the SMF 135 from the AMF 120 may include S-NSSAI A as requested S-NSSAI and S-NS-SAI B as selected S-NSSAI. In addition, the subscribed S-NSSAI of the user equipment subscription information received by the SMF 135 from the UDM 145 does not include S-NSSAI A, but may include S-NSSAI B. In this case, the SMF 135 may determine that the S-NSSAI requested by the user equipment is not included the user equipment subscription information, but the S-NSSAI replaced by the PCF 140 is included in the user equipment subscription information, and perform a subsequent procedure by using the S-NSSAI replaced by the PCF 140.

According to another embodiment, the information received by the SMF 135 from the AMF 120 may include S-NSSAI A as requested S-NSSAI and S-NSSAI B as selected S-NSSAI. Also, subscribed S-NSSAI of the user equipment subscription information received by the SMF 135 from the UDM 145 does not include from the S-NSSAI A but include S-NSSAI B. The SMF 135 may perform a subsequent PDU session establishment procedure by using at least one of information requested by the user equipment 100 or information determined by the PCF 140, based on the priority of the information requested by the user equipment 100 (requested S-NSSAI) and the information determined by the PCF 140 (selected S-NSSAI). For example, when the user equipment 100 has determined to use the requested information, because S-NSSAI A, which is the requested S-NSSAI, is not included in the user equipment subscription information, the SMF 135 may determine that the request is not a valid request, and determine to reject the PDU session establishment request. Alternatively, for example, when the PCF 140 has determined to use the determined information, because S-NSSAI B, which is the selected S-NSSAI, is included in the user equipment subscription information, the SMF 135 may determine that the request is a valid request, and determine to accept the PDU session establishment request.

According to an embodiment of the present disclosure, the information received by the SMF 135 from the AMF 120 may include SSC mode A as a requested SSC mode and S-NSSAI B as a selected SSC mode. Also, a subscribed SSC mode of user equipment subscription information received by the SMF 135 from the UDM 145 does not include SSC mode A but may include SSC mode B. In this case, the SMF 135 may determine that the SSC mode requested by the user equipment is not included in the user equipment subscription information, but the SSC mode replaced by the PCF 140 is included in the user equipment subscription information, and perform a subsequent procedure by using the SSC mode replaced by the PCF 140.

According to another embodiment, the information received by the SMF 135 from the AMF 120 may include SSC mode A as the requested SSC mode and S-NSSAI B as the selected SSC mode. Also, a subscribed SSC mode of the user equipment subscription information received by the SMF 135 from the UDM 145 does not include SSC mode A but may include SSC mode B. The SMF 135 may perform a subsequent PDU session establishment procedure by using at least one of information requested by the user equipment 100 or information determined by the PCF 140, based on the priority of the information requested by the user equipment 100 (requested SSC mode) and the information determined by the PCF 140 (selected SSC mode). For example, when it is determined to use the information requested by the user equipment 100, because SSC mode A, which is the requested SSC mode, is not included in the user equipment subscription information, the SMF 135 may determine that the request is not a valid request, and determine to reject the PDU session establishment request. Alternatively, for example, when it is determined to use the information determined by the PCF 140, because SSC mode B, which is the selected SSC mode, is included in the user equipment subscription information, the SMF 135 may determine that the request is a valid request, and determine to accept the PDU session establishment request.

According to an embodiment of the present disclosure, the information received by the SMF 135 from the AMF 120 may include PDU session type A as a requested PDU session type and PDU session type B as a selected PDU session type. Also, the subscribed PDU session type of the user equipment subscription information received by the SMF 135 from the UDM 145 does not include PDU session type A, but may include PDU session type B. In this case, the SMF 135 may determine that the PDU session type requested by the user equipment is not included in the user equipment subscription information, but the PDU session type replaced by the PCF 140 is included in the user equipment subscription information, and may perform a subsequent procedure by using the PDU session type replaced by the PCF 140.

According to another embodiment, the information received by the SMF 135 from the AMF 120 may include PDU session type A as the requested PDU session type and PDU session type B as the selected PDU session type. In addition, the subscribed PDU session type of the user equipment subscription information received by the SMF 135 from the UDM 145 does not include PDU session type A, but may include PDU session type B. The SMF 135 may perform a subsequent PDU session establishment procedure by using at least one of information requested by the user equipment 100 or information determined by the PCF 140, based on the priority of the information requested by the user equipment 100 (requested PDU session type) and the information determined by the PCF 140 (selected PDU session type), For example, when it is determined to use the information requested by the user equipment 100, because PDU session type A, which is the requested PDU session type, is not included in the user equipment subscription information, the SMF 135 may determine that the request is not a valid request, and determine to reject the PDU session establishment request. Alternatively, for example, when it is determined to use the information determined by the PCF 140, because the PDU session type B, which is the selected PDU session type, is included in the user equipment subscription information, the SMF 135 may determine that the request is a valid request, and may determine to accept the PDU session establishment request.

In operation 724, the SMF 135 may transmit an Nsmf_PDUSession_CreateSMContext Response message to the AMF 120.

In operation 726, the SMF 135 may select a PCF for SM policy.

In operation 728, the SMF 135 may perform an S0M policy association establishment with the selected PCF 140.

In operation 730, the SMF 135 may select an UPF. For example, the SMF 135 may select an UPF based on at least one of the selected DNN, selected S-NSSAI, selected SSC mode, or selected PDU session type replaced by the PCF 140. The SMF 135 may establish an N4 session with the selected UPF 130.

In operation 732, the SMF 135 may perform an SM policy association establishment with the PCF 140.

In operation 734, the SMF 135 may transmit a Namf_Communication_N1N2MessageTransfer Request message to the AMF 120. The Namf_Communication_N1N2MessageTransfer Request message may include a PDU Session Establishment Accept message. The PDU Session Establishment Accept message may include information requested by the user equipment (e.g., requested DNN, requested S-NSSAI, requested SSC mode, requested PDU session type).

In operation 736, the AMF 120 may transmit an N2 PDU Session Request message to the base station 110. The N2 PDU Session Request message may include a PDU Session Establishment Accept message received by the AMF 120 from the SMF 135.

In operation 738, the base station 110 may perform AN-specific resource setup with the user equipment 100. The base station 110 may transmit an RRC message to the user equipment 100 for AN-specific resource setup. Here, the RRC message transmitted by the base station 110 to the user equipment 100 for AN-specific resource setup may include a PDU Session Establishment Accept message received by the base station 110 from the AMF 120.

The PCF 140 according to an embodiment of the present disclosure may determine to no longer apply the policy being applied to resolve the mismatch between the use equipment subscription information and the UE policy application.

The PCF 140 may receive UE policy information (e.g., a PSI list) currently applied by the user equipment 100, from the AMF 120 in operation 230 of FIG. 2 or operation 310 of FIG. 3. The PCF 140 may compare the user equipment information stored in the PCF 140 (e.g., a PSI list indicating the latest UE policy information of the user equipment 100) or user equipment information received from the UDR 150 (e.g., a PSI list indicating the latest UE policy information of the user equipment 100) with the UE policy information that is received from the AMF 120 and is currently applied by the user equipment 100 (e.g., a PSI list indicating the UE policy information that the user equipment 100 is currently applying). When the user equipment information stored in the PCF 140 (e.g., a PSI list indicating the latest UE policy information of the user equipment 100) or the user equipment information received from the UDR 150 (e.g., a PSI list indicating the latest UE policy information of the user equipment 100) is the same as the UE policy information that is received from the AMF 120 and is currently applied by the user equipment 100 (e.g., a PSI list indicating the UE policy information that the user equipment 100 is currently applying), the PCF 140 may determine that the user equipment 100 is currently applying the latest UE policy information.

In addition, the PCF 140 may determine, based on the information stored in the PCF 140 (e.g., user equipment context information stored in the PCF 140, etc.), whether the policies shown in [Table 4] (e.g., referred to as SMF selection management policies) are currently applied for the user equipment 100.

When it is determined that the user equipment 100 is applying the latest UE policy information in a state in which the policies shown in [Table 4] are currently being applied for the user equipment 100, the PCF 140 may determine that the mismatch between the user equipment subscription information and the UE policy application has been resolved. Accordingly, the PCF 140 may determine to no longer apply the policies shown in [Table 4] that are being applied to resolve the mismatch between the UE subscription information and the UE policy application.

The PCF 140 may transmit the message of operation 514 of FIG. 5 to the AMF 120 to update access and mobility related policy information so that the currently applied policies shown in [Table 4] are no longer applied. For example, the message of operation 514 of FIG. 5 may include an indicator indicating that the policies shown in [Table 4] (e.g., referred to the SMF selection management policies) are not applied. Alternatively, for example, the message of operation 514 of FIG. 5 may not include the policies shown in [Table 4] (e.g., referred to as the SMF selection management policies).

Upon receiving the message of operation 514 of FIG. 5, the AMF 120 may determine, based on the received message, that the policies shown in [Table 4] currently being applied for the user equipment 100 are no longer applied. For example, when the message of operation 514 of FIG. 5 includes an indicator indicating that the policies shown in [Table 4] (e.g., referred to as the SMF selection management policy) are not applied, the AMF 120 may determine, based on the received indicator, that the policies shown in [Table 4] are no longer applied. Alternatively, for example, when the policies shown in [Table 4] (e.g., referred to as the SMF selection management policy) are not included in the message of operation 514 of FIG. 5, the AMF 120 may determine, based on the received message not including the policies shown in [Table 4], that the policies shown in [Table 4] are no longer applied.

The AMF 120 may update Access and Mobility related policy information which is being applied to the user equipment 100, based on the received message of operation 514 of FIG. 5. The AMF 120 may not apply the policies shown in [Table 4]. Then, when the AMF 120 receives the PDU Session Establishment Request message from the user equipment 100 in operation 710 of FIG. 7, as the policies shown in [Table 4] are not being applied for the user equipment 100, operations 712 to operation 716 may be omitted. That is, the AMF 120 and the SMF 135 may perform the PDU session establishment procedure illustrated in FIG. 7 by using the information requested by the user equipment 100 (e.g., requested DNN, requested S-NS-SAI, requested SSC mode, requested PDU session type).

Figure 8:
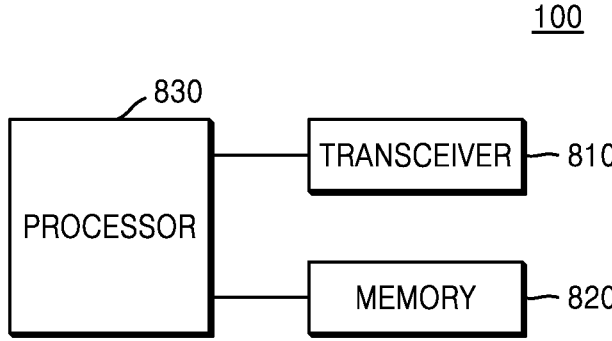
FIG. 8 is a block diagram illustrating a structure of a user equipment according to an embodiment of the present disclosure.

FIG. 8 is a block diagram illustrating a structure of a user equipment according to an embodiment of the present disclosure.

As illustrated in FIG. 8, the user equipment 100 of the present disclosure may include a processor 830, a transceiver 810, and a memory 820. Components of the user equipment 100 are, however, not limited thereto. For example, the user equipment 100 may include more or fewer elements than described above. In addition, the processor 830, the transceiver 810, and the memory 820 may be implemented in the form of a single chip.

According to an embodiment, the processor 830 may control a series of processes in which the user equipment 100 may operate according to the embodiment of the present disclosure described above. For example, in the wireless communication system according to an embodiment of the present disclosure, components of the user equipment 100 may be controlled to provide a service requested by the user equipment 100. The processor 830 may be provided in plurality, and the processor 830 may perform an operation for providing a service, according to the present disclosure described above, by executing a program stored in the memory 820.

The transceiver 810 may transmit or receive signals with the base station. A signal transmitted or received to or from a base station may include control information and data. The transceiver 810 may include an RF transmitter for up-converting and amplifying a frequency of a transmitted signal, and an RF receiver for performing low-noise amplification on the received signal and down-converting the received signal. This is merely an example, and the elements of the transceiver 810 are not limited to the RF transmitter and RF receiver. In addition, the transceiver 810 may receive a signal via a radio channel and output the same to the processor 830, and transmit the signal output from the processor 830, via a radio channel.

According to an embodiment, the memory 820 may store program and data required for operation of the user equipment 100. In addition, the memory 820 may store control information or data included in a signal transmitted or received by the user equipment 100. The memory 820 may include a storage medium such as ROM, RAM, a hard disk, CD-ROM, and DVD, or a combination of storage mediums. Also, the memory 820 may refer to a plurality of memories. According to an embodiment, the memory 820 may store a program for performing a method of providing a service requested by the user equipment 100 in a wireless communication system, which are the embodiments of the present disclosure described above.

Figure 9:
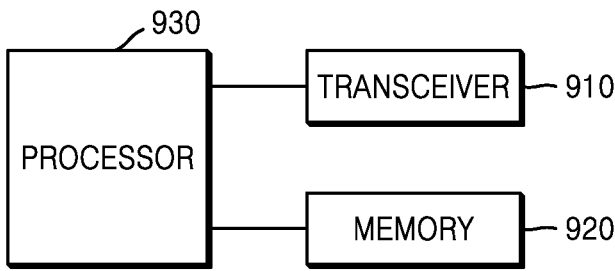
FIG. 9 is a block diagram illustrating a structure of a core network entity according to an embodiment of the present disclosure.

FIG. 9 is a block diagram illustrating a structure of a core network entity according to an embodiment of the present disclosure.

FIG. 9 is a block diagram illustrating a structure of a core network entity in a wireless communication system, according to an embodiment of the present disclosure. The term 'unit', ' . . . er(or)' used herein refers to a unit for processing at least one function or operation, and may be implemented by hardware or software or a combination of hardware and software. According to an embodiment, the core network entity may include the AMF 120, the SMF 135, the PCF 140, or the UDM 145, but is not limited thereto.

Referring to FIG. 9, the core network entity may include the transceiver 910, the memory 920, and the processor 930.

The transceiver 910 may provide an interface for performing communication with other devices in a network. That is, the transceiver 910 may convert a bit string transmitted from the core network entity to another device, into a physical signal, and convert a physical signal received from another device, into a bit string. That is, the transceiver 910 may transmit or receive a signal. Accordingly, the transceiver 910 may be referred to as a modem, a transmitter, a receiver, a communication unit, or a communication module. Here, the transceiver 910 may allow a core network entity to communicate with other apparatuses or systems via a backhaul connection (e.g., wired backhaul or wireless backhaul), or other connection methods or networks.

The memory 920 may store data such as a default program, an application program, or configuration information for operating the core network entity. The memory 920 may be configured with a volatile memory, a non-volatile memory, or a combination of a volatile memory and a non-volatile memory. In particular, the memory 920 may provide stored data according to a request from the processor 930.

The processor 930 may control overall operations of the core network entity. For example, the processor 930 may transmit or receive a signal via the transceiver 930. Furthermore, the processor 930 may write or read data to or from the memory 920. For this purpose, the processor 930 may include at least one processor. The processor 930 may control the core network entity to perform the operations according to an embodiment to be described below. For example, the processor 930 may control the components of the core network entity such that the components perform the method of providing a service requested by the user equipment, according to the present disclosure.

FIG. 10 is a flowchart of an operating method of a user equipment, according to an embodiment of the present disclosure.

Referring to FIG. 10, in operation 1010, the user equipment may transmit, to a base station, a registration request including a first policy section identifier (PSI) list corresponding to a UE policy stored in the user equipment. According to an embodiment, a registration request message may include a user equipment identifier (e.g., Subscription Permanent Identifier (SUR), SUCI (Subscription Concealed Identifier (SUCI), 5G Globally Unique Temporary Identifier (5G-GUTI), etc.), a request slice (Requested NSSAI: slice information that the user equipment wants to use by accessing the network), a UE policy container, UE policy-related information (e.g., a first PSI list indicating the UE policy stored in the user equipment) (a list of PSIs)), and the like. The UE policy container may include UE policy-related information stored in the user equipment (e.g., a first PSI list indicating a UE policy stored in the user equipment (a list of PSIs)).

In operation 1030, the user equipment may receive a registration approval message including a second PSI list corresponding to the updated UE policy from an Access and Mobility Management Function (AMF). In an embodiment, the latest list of PSIs indicating the updated UE policy is referred to as the second PSI list. The AMF may transmit a DL Non Access Stratum (NAS) Transport message to the user equipment. The DL NAS Transport message may include UE policy information and the second PSI list received by the AMF from the PCF in operation 318.

In operation 1050, the user equipment may update the user equipment policy based on the received second PSI list. In an embodiment, the user equipment may store the received UE policy information, the second PSI list, or the like. In addition, the user equipment may apply the received UE policy information. The user equipment may determine when to apply the received UE policy. For example, the user equipment may determine to apply the UE policy immediately upon receipt. Alternatively, the user equipment may determine to apply the UE policy in an idle mode. Alternatively, the user equipment may determine to apply the UE policy after one or more protocol data unit (PDU) sessions that are currently in use are ended. However, the present disclosure is not limited to the above example.

FIG. 11 is a flowchart of an operating method of a policy control function (PCF), according to an embodiment of the present disclosure.

Referring to FIG. 11, in operation 1110, a PCF may receive, from a user equipment, a first policy section identifier (PSI) list corresponding to the UE policy stored in the user equipment. In an embodiment, the user equipment may configure a registration request message including the first PSI list and transmit the same to the base station, the base station may transmit the registration request message to the AMF, and the AMF may store information received from the user equipment, for example, the first PSI list (a list of PSIs) indicating the UE policy stored in the user equipment, as a UE context, and the AMF may transmit the first PSI list to the PCF.

In operation 1130, the PCF may identify whether the received first PSI list matches the second PSI list corresponding to the updated UE policy obtained from a Unified Data Repository (UDR).

In an embodiment, the PCF may compare the first PSI list among the information received from the AMF with the latest list of PSIs of the user equipment, stored in the PCF and/or UDR, that is, the second PSI list. When the first PSI list does not match the second PSI list, the PCF may determine that the user equipment is not storing the latest UE policy information, and determine to transmit the latest UE policy information to the user equipment.

In another embodiment, the PCF may determine to update the UE policy based on user equipment subscription information, operator policy, or the like. The PCF may determine the updated UE policy. Also, the PCF may allocate a latest PSI indicating the updated UE policy. The latest list of PSIS indicating the updated UE policy is referred to as the second PSI list.

In operation 1150, the PCF may transmit, based on a result of the identifying, at least one of the first PSI list and the second PSI list to an Access and Mobility Management Function (AMF). The PCF may transmit a Npcf_UEPolicy-Control_Create response message to the AMF. In an embodiment, the Npcf_UEPolicyControl_Create response message transmitted by the PCF to the AMF may include the latest UE policy information of the user equipment, that is, the second PSI list. The AMF may store second PSI information received from the PCF. For example, the AMF may store the second PSI information as a UE context. Accordingly, the AMF may store UE policy-related information of the user equipment, for example, the first PSI list and the second PSI list.

The methods according to the embodiments disclosed in the claims or the specification of the present disclosure may be implemented as hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media, A plurality of such memories may be included.

The programs may also be stored in an attachable storage device which is accessible through a communication network such as the Internet, an intranet, a local area network (LAN), a wireless LAN (WLAN), or a storage area network (SAN), or a combination thereof. Such a storage device may access the electronic device via an external port. Furthermore, an additional storage device on a communication network may access a device that performs the embodiments of the present disclosure.

In the embodiments of the present disclosure described above, an element or elements included in the present disclosure are expressed in a singular or plural form depending on the described embodiments of the present disclosure. However, the singular or plural form is appropriately selected for convenience of description and the present disclosure is not limited thereto. As such, an element expressed in a plural form may also be configured as a single element, and an element expressed in a singular form may also be configured as plural elements.

In the detailed description of the present disclosure, a specific embodiment has been described, but it goes without saying that various modifications are possible without departing from the scope of the present disclosure. Thus, the scope of the present disclosure is not limited to the embodiments described herein and should be defined by the appended claims and their equivalents. In other words, it is obvious to those skilled in the art that other modifications based on the technical spirit of the present disclosure can be implemented. Also, when necessary, the above respective embodiments may be employed in combination. For example, portions of the methods provided by the present disclosure may be combined with each other to enable the BS and the UE to operate. Also, although the above embodiments have been presented with reference to 5G and NR systems, other modifications based on the technical idea of the embodiments may also be implemented in connection with other systems such as LTE, LTE-A, and LTE-A-Pro systems.

The invention claimed is:

1. A policy control function (PCF) entity for controlling policies, the PCF entity comprising:
    a transceiver; and
    at least one processor, wherein the at least one processor is configured to:
    control the transceiver to transmit user equipment route selection policy (URSP) information including first data network name (DNN) information for a user equipment to an access and mobility management function (AMF);
    identify a triggering event to update the URSP;
    control the transceiver to transmit, updated URSP information including second DNN information for the user equipment based on the identified triggering event, to the AMF;
    control the transceiver to transmit a session management function (SMF) selection management trigger policy to the AMF, when transmitting the updated URSP information including the second DNN information;
    control the transceiver to receive a user equipment policy update request message from the AMF;
    select a replacement DNN to be applied to the user equipment based on the received user equipment policy update request message; and
    control the transceiver to provide, to the AMF, the selected replacement DNN to be applied to the user equipment.

2. The PCF entity of claim 1, wherein a protocol data unit (PDU) session between the user equipment and a network is established based on the selected replacement DNN information, after an SMF has received, from the AMF, a PDU session management context request message including information about the selected replacement DNN and user equipment-requested DNN information.

3. The PCF entity of claim 1, wherein the SMF selection management trigger policy comprises at least one of the first DNN information, information related to a network slice, or information related to a PDU session type.

4. The PCF entity of claim 1, wherein the updated URSP information and the SMF selection management trigger policy are included and transmitted in a single message or are included and transmitted in different messages.

5. The PCF entity of claim 1, wherein a PDU session between the user equipment and a network is established based on a result of comparing at least one of the first DNN information received by the AMF from the PCF entity or information received by the AMF from a unified data management (UDM) with user equipment-requested DNN information received from the user equipment.

6. An access and mobility management function (AMF) entity for managing policies, the AMF entity comprising:

a transceiver; and at least one processor, wherein the at least one processor is configured to:

control the transceiver to receive a session management function (SMF) selection management trigger policy, when receiving updated URSP information including second DNN information from a policy control function (PCF), control the transceiver to transmit the received updated URSP information to a user equipment, control the transceiver to receive, from the user equipment, a protocol data unit (PDU) session establishment request message including user equipment-requested DNN information corresponding to a first DNN, detect, based on the received PDU session establishment request message, the user equipment requesting the first DNN, control the transceiver to transmit a user equipment policy update request message to the PCF, and control the transceiver to receive, from the PCF, a replacement DNN to be applied to the user equipment selected based on the user equipment policy update request message, wherein the selected replacement DNN to be applied to the user equipment is a DNN selected by the PCF.

7. The AMF entity of claim 6, wherein the at least one processor is further configured to control the transceiver to transmit, to an SMF, a session management context request message including DNN information selected by the PCF or the user equipment-requested DNN information.

8. The AMF entity of claim 6, wherein the at least one processor is further configured to control the transceiver to receive, from the PCF, in response to the user equipment policy update request message, a user equipment policy update response message including DNN information selected by the PCF, and control the transceiver to transmit, to an SMF, a protocol data unit (PDU) session management context request message including information about the selected replacement DNN and user equipment-requested DNN information, wherein a PDU session between the user equipment and a network is established based on the selected replacement DNN information after the SMF has received the PDU session management context request message from the AMF entity.

9. The AMF entity of claim 6, wherein the SMF selection management trigger policy comprises information on the first DNN, information related to a network slice, or information related to a PDU session type.

10. The AMF entity of claim 6, wherein the updated URSP information and the SMF selection management trigger policy are included and transmitted in a single message or are included and transmitted in different messages.

11. The AMF entity of claim 6, wherein the at least one processor is further configured to identify that the second DNN information does not match the user equipment-requested DNN information, and control the transceiver to transmit a user equipment policy update request message to the PCF based on a result of the identifying.

\* \* \* \* \*